(12) United States Patent
Ban et al.

(10) Patent No.: US 6,859,339 B2
(45) Date of Patent: Feb. 22, 2005

(54) MASTER INFORMATION MAGNETIC RECORDING APPARATUS AND METHOD FOR MANUFACTURING MAGNETIC RECORDING MEDIUM IN WHICH INFORMATION IS RECORDED BY USING THIS

(75) Inventors: Yasuaki Ban, Hirakata (JP); Keizo Miyata, Yawata (JP); Taizou Hamada, Katano (JP); Kouji Taniguchi, Yokohama (JP); Masaya Sakaguchi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 176 days.

(21) Appl. No.: 10/355,860

(22) Filed: Jan. 30, 2003

(65) Prior Publication Data

US 2003/0142427 A1 Jul. 31, 2003

(30) Foreign Application Priority Data

Jan. 31, 2002 (JP) ........................................ 2002-023022

(51) Int. Cl.[7] ................................................ G11B 5/86
(52) U.S. Cl. .............................. 360/17; 360/16; 360/15
(58) Field of Search .............................. 360/17, 15, 16

(56) References Cited

U.S. PATENT DOCUMENTS

| | | | |
|---|---|---|---|
| 4,549,232 A | 10/1985 | Axmear et al. | 360/77 |
| 6,304,407 B1 | 10/2001 | Baker et al. | 360/75 |
| 6,611,388 B1 * | 8/2003 | Miyata et al. | 360/17 |

FOREIGN PATENT DOCUMENTS

| | | |
|---|---|---|
| EP | 0 915 456 | 5/1999 |
| GB | 2 361 576 | 10/2001 |
| JP | 60-10472 | 1/1985 |
| JP | 8-221919 | 8/1996 |
| JP | 10-40544 | 2/1998 |
| JP | 11-273069 | 9/1999 |

OTHER PUBLICATIONS

Yamaguchi, T., 1996, "Head–Positioning Servo Technology for Magnetic Disk Drives", Journal of the Magnetics Society, vol. 20, No. 3, pp 771–776.

* cited by examiner

*Primary Examiner*—Sinh Tran
*Assistant Examiner*—Rocio Colon
(74) *Attorney, Agent, or Firm*—Merchant & Gould P.C.

(57) ABSTRACT

The master information recording apparatus 100 includes a master information carrier, a master information carrier facing member, and a magnetic field applying member. A ferromagnetic thin film pattern formed on the surface of the master information carrier includes not less than two kinds of different patterns each having a different pattern angle showing an angle with respect to the direction of the relative movement between a magnetic head and a rotating magnetic recording medium. The magnetic field applying unit applies a magnetic field along the direction, which is perpendicular to the direction shown by an angle that is smaller than the pattern angle of the maximum pattern and larger than the minimum pattern angle of the pattern among the not less than two kinds of patterns.

20 Claims, 22 Drawing Sheets

MASTER INFORMATION MAGNETIC RECORDING APPARATUS AND METHOD FOR MANUFACTURING MAGNETIC RECORDING MEDIUM IN WHICH INFORMATION IS RECORDED BY USING THIS

FIELD OF THE INVENTION

The present invention relates to a master information magnetic recording apparatus for prerecording predetermined information signals, using a master information carrier, in a magnetic recording medium with large capacity and high recording density used in a magnetic recording/reproducing apparatus, and a magnetic recording medium in which information signals are recorded by using the same.

BACKGROUND OF THE INVENTION

In recent years, magnetic recording/reproducing apparatuses are being designed to have a higher recording density in order to achieve a large capacity with a small size. In the field of a hard disk device, which is a typical magnetic recording/reproducing apparatus, the recording density is rapidly increasing at the rate of 100% per year. As the technical background for enabling such a high recording density, significant factors include the improvement in the linear recording density achieved by the improvement in the performance of a magnetic recording medium and a head-disk interface, as well as the appearance of a new signal processing mode such as a partial response.

In recent years, however, the tendency toward an increase in the track density significantly exceeds that of the linear recording density, thus improving the areal recording density. This is due to the fact that a magneto-resistive type head, which has a much improved reproduction output performance compared with a conventional inductive type magnetic head, has come into practical use. At present, with the practical use of the magneto-resistive type head, a signal with a track width in the sub micron range can be reproduced with a high S/N ratio.

In order for a magnetic head to trace such narrow tracks accurately and to reproduce signals at a high S/N ratio, the tracking servo technology of the magnetic head plays an important role. Such a tracking servo technology is described in detail in, for example, "Yamaguchi: Highly Accurate Servo Technology of Magnetic Disk Apparatus, Journal of the Magnetics Society, Vol. 20, No. 3, pp. 771 (1996)".

FIG. 32 is a plan view showing a configuration of a conventional magnetic disk device 90. The magnetic disk device 90 has a disk-shaped magnetic disk 8. The magnetic disk 8 is rotated by a motor (not shown).

The magnetic disk device 90 has a head arm 225 pivotably provided around a pivot axis 226. At the tip of the head arm 225, a head suspension 222 is provided. On the tip of the head suspension 222, a magnetic head 221 is mounted. The magnetic disk device 90 is provided with a voice coil motor 223 for driving the head arm 225 in a way in which the voice coil motor 223 is placed on the opposite side of the head arm 225 with respect to the pivot axis 226 disposed therebetween.

In the magnetic disk device 90 having such a configuration, when the head arm 225 is driven by the voice coil motor 223, the head arm 225 pivots around the pivot axis 226. Therefore, the magnetic head 221 mounted on the head suspension 222 moves on the rotating magnetic disk 8 along an arc-shaped tracking scanning orbit 224 having the pivot axis 226 as its center.

According to the document mentioned above, a magnetic disk provided for the magnetic disk device has regions (hereafter referred to as "preformat recording region") spaced at predetermined angles over a revolution of a disk, that is, over an angle of 360 degrees. In the preformat recording region, as shown in FIG. 33, a synchronous signal pattern 211, a sector mark pattern 212, an address information signal pattern 213 and a tracking servo signal pattern 214, etc. are recorded. Thus, the magnetic head, based on these patterns, reproduces signals at every predetermined period to verify its position and corrects its displacement in the radial direction of the magnetic disk as required, thus tracing a track correctly.

Prerecording the above-mentioned preformat information signal patterns (master information) such as the synchronous signal pattern 211, the sector mark pattern 212, the address information signal pattern 213 and the tracking servo signal pattern 214, etc. is referred to as a preformat recording. A master information magnetic recording technology that is a technology enabling the preformat recording in a short time is disclosed in JP 10 (1998)-40544A. This master information magnetic recording technology enables the preformat recording in a short time.

Herein, a method for prerecording master information on a magnetic disk will be explained. First, a magnetic disk is magnetized in one direction, thus initializing the magnetic disk. Next, the master information carrier on which ferromagnetic thin film patterns are formed is brought into contact with the magnetic disk. The ferromagnetic pattern herein denotes a pattern corresponding to an information signal to be preformat-recorded. For example, in the case of preformat-recording signals shown in FIG. 33, the ferromagnetic pattern is a pattern corresponding to FIG. 33. Thereafter, a magnetic field (referred to as a transfer field) is applied from the outside to the magnetic disk with which the master information carrier is brought into contact.

Note here, it is desirable that the direction of the magnetic field at the time of initialization is a direction opposite to the direction of the transfer field. The ferromagnetic thin film patterns formed on the master information carrier are magnetized. The magnetic field is weakened at the part facing the ferromagnetic thin film patterns on the master information carrier and strengthened at a part that does not face the ferromagnetic thin films on the master information carrier. Therefore, on the magnetic disk, the part that does not face the ferromagnetic thin film on the master information carrier is magnetized in the direction of the transfer field; and the part corresponding to the part facing the ferromagnetic thin film on the master information carrier is not magnetized by the transfer field and the direction of magnetization at the time of initialization is maintained. Consequently, at the edge of the ferromagnetic thin film on the master carrier, magnetization reversal occurs. Thus, it is possible to record a magnetization pattern corresponding to the ferromagnetic thin film patterns formed on the master carrier in the magnetic recording medium.

Thus, the master information magnetic recording causes the magnetization reversal along the edge of the ferromagnetic thin film pattern on the master information carrier. Therefore, in order to obtain excellent reproduced signals, it is desirable that the direction of the transfer field approximates the direction perpendicular to the edge of the ferromagnetic thin film on the master carrier.

Herein, a line parallel to the direction of the relative movement between the magnetic head and the magnetic disk due to a rotation of the magnetic disk is referred to as a pattern angle reference; and an angle made by the pattern angle reference and the ferromagnetic thin film pattern formed on the master information carrier is referred to as a pattern angle. In general, this pattern angle differs according to the radial position of the disk.

The pattern angle is an angle made by a tangent of an arc showing an orbit on which the magnetic head on the pivoting head arm moves and the moving direction of the head, which is perpendicular to the radial direction of the magnetic disk. Therefore, the pattern angle gradually changes from the inner circumference to the outer circumference of the magnetic disk.

On the other hand, JP 11 (1999)-273069A proposes that the direction of the transfer field is to be a direction of the normal to the arc that is a moving orbit of the magnetic head (hereafter, referred to as "head orbit"), thereby improving the signal recorded in the magnetic disk.

The general preformat pattern includes a plurality of different patterns that are constituting elements thereof, such as a synchronous signal pattern, a sector mark pattern, an address information signal pattern, and a tracking servo signal pattern, etc., which are sequentially disposed in the moving direction of a magnetic head. Each kind of the patterns is formed along the head orbit. Therefore, if the radial position is the same, the pattern angles of each pattern are the same.

However, in some preformat patterns, plural types of patterns sequentially existing toward the moving direction of the head have different pattern angles, respectively. A typical example of such a pattern is a tracking servo signal corresponding to the phase detection method. The phase detection method is proposed in, for example, JP60 (1985)-10472A, JP8 (1996)-221919A, etc. This phase detection method is a detection method which is not likely to be affected by noise and can obtain the position error signal with high accuracy. Therefore, in the case where the track density is much more increased in the future, the method is becoming an important method capable of corresponding to the improvement of the positioning accuracy of the head.

FIG. 34 is an enlarged view for explaining a configuration of another preformat information signal patterns, which is to be formed on a conventional master information carrier as ferromagnetic thin film patterns. This ferromagnetic thin film pattern 94 corresponds to a preformat pattern of the phase detection method disclosed in the JP8 (1996)-221919A mentioned above.

The ferromagnetic pattern 94 includes a synchronous signal pattern 95, a sector mark pattern 91, an address information signal pattern 98, a tracking servo signal pattern 96 and a tracking servo signal pattern 97. The servo signal pattern 97 is formed tilting with respect to the servo signal pattern 96. Therefore, when the magnetic head shifts along the radial direction of the magnetic disk, the position of a pulse gradually changes. Therefore, a phase difference occurs between the servo signal pattern 96 and the servo signal pattern 97.

All of the synchronous signal pattern 95, the sector mark pattern 91, the address information signal pattern 98 and the servo signal pattern 96, which are included in this ferromagnetic thin film pattern 94, are formed along the head orbit. Therefore, when the radial position is the same, these patterns have the same pattern angles.

However, the servo signal pattern 97 is formed tilting with respect to these patterns and therefore it has a pattern angle that is different from that of these patterns.

In this case, as mentioned above, when the direction of the transferr field is to be a direction of the normal to the head orbit, the normal line with respect to the edge of the ferromagnetic thin film on the master information carrier corresponding to the servo signal pattern 97 and the direction of the transfer field are displaced from each other. Therefore, the magnetic field change lacks sharpness at the edge of the ferromagnetic thin film on the master information carrier. As a result, the position of the magnetization reversal, that is, the position of a pulse becomes unclear. This causes the phase disturbance of signals, thus making the highly accurate positioning of the head by the phase detection method difficult. Furthermore, the effective strength of the transfer field with respect to the servo signal pattern 97 is different from that with respect to the other patterns. As a result, it becomes difficult to set an appropriate transfer field condition for all patterns having different pattern angles. When recording with an appropriate transfer field cannot be carried out, the reproduction output decreases.

The problems such as the phase disturbance of signals or the reduction of the reproduction output as mentioned above become more serious as the displacement of the transfer field direction with respect to the direction perpendicular to the ferromagnetic substance on the master information carrier becomes larger.

That is, in the preformat pattern in which plural types of patterns having different pattern angles are present in the moving direction of a magnetic head, it becomes important to achieve the quality of signals acceptable for practical use by minimizing the phase disturbance of signals or reduction of the reproduction output.

It is an object of the present invention to provide a master information recording apparatus capable of enhancing the reliability of recording preformat patterns and a magnetic recording medium on which information is recorded using the same from the view point of the above-mentioned problems.

SUMMARY OF THE INVENTION

The master information recording apparatus according to the present invention includes a master information carrier having a surface on which a ferromagnetic thin film pattern corresponding to an information signal is formed, a master information carrier facing member for allowing a recording surface formed on a magnetic recording medium to face the surface of the master information carrier on which the ferromagnetic thin film pattern is formed, and a magnetic field applying member for applying a magnetic field to the ferromagnetic thin film pattern formed on the surface of the master information carrier that faces the recording surface formed on the magnetic recording medium and to the magnetic recording medium in order to record the information signals into the magnetic recording medium. The ferromagnetic thin film pattern formed on the surface of the master information carrier comprises not less than two kinds of different patterns each having a different pattern angle which means an angle with respect to the direction of the relative movement between the magnetic head mounted on an arm and the rotating magnetic recording medium. The member for applying a magnetic field applies the magnetic field along the direction in which a magnetic field is applied, the direction being perpendicular to the direction shown by an angle that is smaller than the maximum pattern angle among the not less than two kinds of patterns, and that is larger than the minimum pattern angle among the not less than two kinds of patterns.

The method for manufacturing a magnetic recording medium according to the present invention is a method for manufacturing a magnetic recording medium in which master information is recorded in advance. The method includes: allowing a recording surface formed on a magnetic recording medium to face a surface of a master information carrier on which a ferromagnetic thin film pattern corresponding to an information signal is formed, and applying a magnetic field to the ferromagnetic thin film pattern formed on the surface of the master information carrier that faces the recording surface formed on the magnetic recording medium and to the magnetic recording medium, in order to record the information signal into the magnetic recording medium. In the method, the ferromagnetic thin film pattern formed on the surface of the master information carrier comprises not less than two kinds of different patterns each having a different pattern angle which means an angle with respect to the direction of the relative movement between the magnetic head mounted on an arm and the rotating magnetic recording medium, and the member for applying a magnetic field applies the magnetic field along the direction in which a magnetic field is applied, the direction being perpendicular to the direction shown by an angle that is smaller than the maximum pattern angle among the not less than two kinds of patterns and larger than the minimum pattern angle among the not less than two kinds of patterns.

DESCRIPTION OF THE PREFERRED EMBODIMENTS

Figure 1:
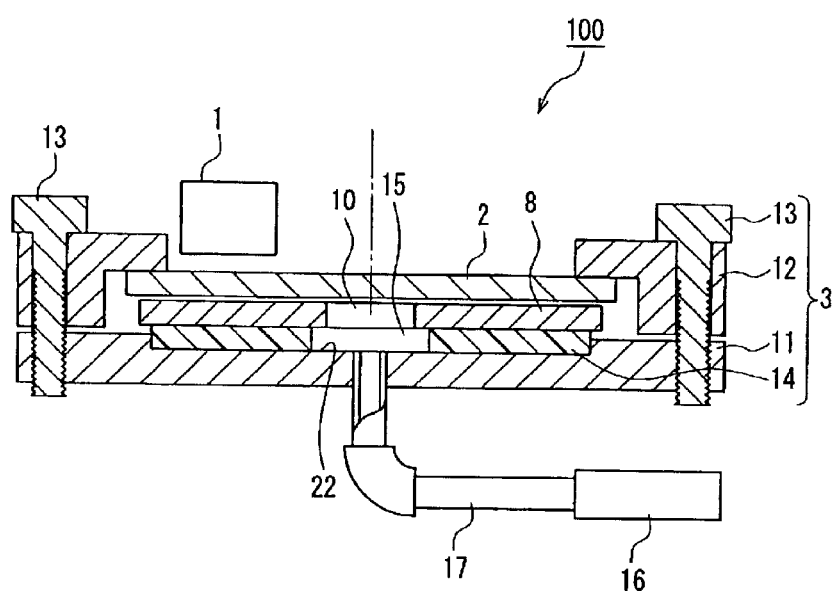
FIG. 1 is a cross-sectional view showing a configuration of a master information magnetic recording apparatus according to a first embodiment of the present invention.

In the master information magnetic recording apparatus according to the embodiment of the present invention, the ferromagnetic thin film pattern formed on the surface of the master information carrier comprises not less than two kinds of different patterns each having a different pattern angle, and a magnetic field is applied along the direction in which a magnetic field is applied, which is perpendicular to the direction shown by an angle that is smaller than the maximum pattern angle, and that is larger than the minimum pattern angle of the pattern among the not less than two kinds of patterns.

Therefore, it is possible to increase the reproduction output of a servo signal pattern reproduced by a magnetic recording medium. Consequently, it is possible to provide a master information magnetic recording apparatus enabling a highly reliable preformat recording into the magnetic recording medium.

It is preferable that the not less than two kinds of patterns are two kinds of patterns each having a different pattern angle.

It is preferable that the direction in which a magnetic field is applied is a direction perpendicular to an average direction of the directions shown by the pattern angles of two kinds of patterns among the not less than two kinds of patterns.

It is preferable that the direction in which a magnetic field is applied is a direction with a weight assigned so that the angle with respect to either one of directions is smaller than the angle with respect to another direction, in the two kinds of directions perpendicular to the directions shown by the pattern angles of the two kinds of patterns, respectively.

It is preferable that the magnetic recording medium is a magnetic disk, and that the weight changes along the radial direction of the magnetic disk.

It is preferable that the member for applying a magnetic field is made of a permanent magnet.

It is preferable that the permanent magnet is provided with a facing surface that faces the master information carrier, and the facing surface is substantially fan-shaped.

It is preferable that the member for applying a magnetic field is disposed on the master information carrier at the opposite side to the magnetic recording medium.

It is preferable that the member for applying a magnetic field comprises a pair of magnetic cores and a coil wound to at least one of the pair of magnetic cores.

It is preferable that the master information carrier facing member comprises a lower flange provided for superimposing and mounting the magnetic recording medium and the master information carrier in this order, an upper flange provided on the lower flange for pressing an edge portion of the upper surface of the master information carrier, and a connecting member for connecting the lower flange to the upper flange.

It is preferable that the master information carrier facing member further comprises an elastic plate provided between the lower flange and the magnetic recording medium.

It is preferable that center holes are formed at the centers of the magnetic recording medium and the elastic member, respectively.

It is preferable that the master information magnetic recording apparatus further includes a suction device for drawing the master information carrier toward the side of the information recording medium in order to bring the master information carrier into contact with the magnetic recording medium, wherein the suction device is provided with an exhaust duct so as to communicate with the center holes formed at the centers of the magnetic recording medium and the elastic plate, respectively.

It is preferable that the master information magnetic recording apparatus further includes a suction device for drawing the master information carrier toward the side of the information recording medium in order to bring the master information carrier into contact with the magnetic recording medium.

In the method for manufacturing the magnetic recording medium according to the embodiment of the present invention, a magnetic field is applied along the direction in which a magnetic field is applied, which is perpendicular to the direction shown by an angle that is smaller than the maximum pattern angle and larger than the minimum pattern angle among the not less than two kinds of patterns.

Therefore, it is possible to further increase a reproduction output of a servo signal pattern reproduced by the magnetic recording medium. Consequently, it is possible to provide a magnetic recording medium in which a highly reliable preformat recording is carried out.

It is preferable that the not less than two kinds of patterns are two kinds of patterns each having a different pattern angle.

It is preferable that the direction in which a magnetic field is applied is a direction perpendicular to an average direction of the directions shown by the pattern angles of two kinds of patterns among the not less than two kinds of patterns.

It is preferable that the direction in which a magnetic field is applied is a direction with a weight assigned so that the angle with respect to either one of directions is smaller than the angle with respect to another direction in the two kinds of directions perpendicular to the directions shown by the pattern angles of the two kinds of patterns, respectively.

It is preferable that the magnetic recording medium is a magnetic disk, and the weight changes along the radial direction of the magnetic disk.

Hereinafter, the present invention will be explained with reference to drawings.

(First Embodiment)

Figure 2:
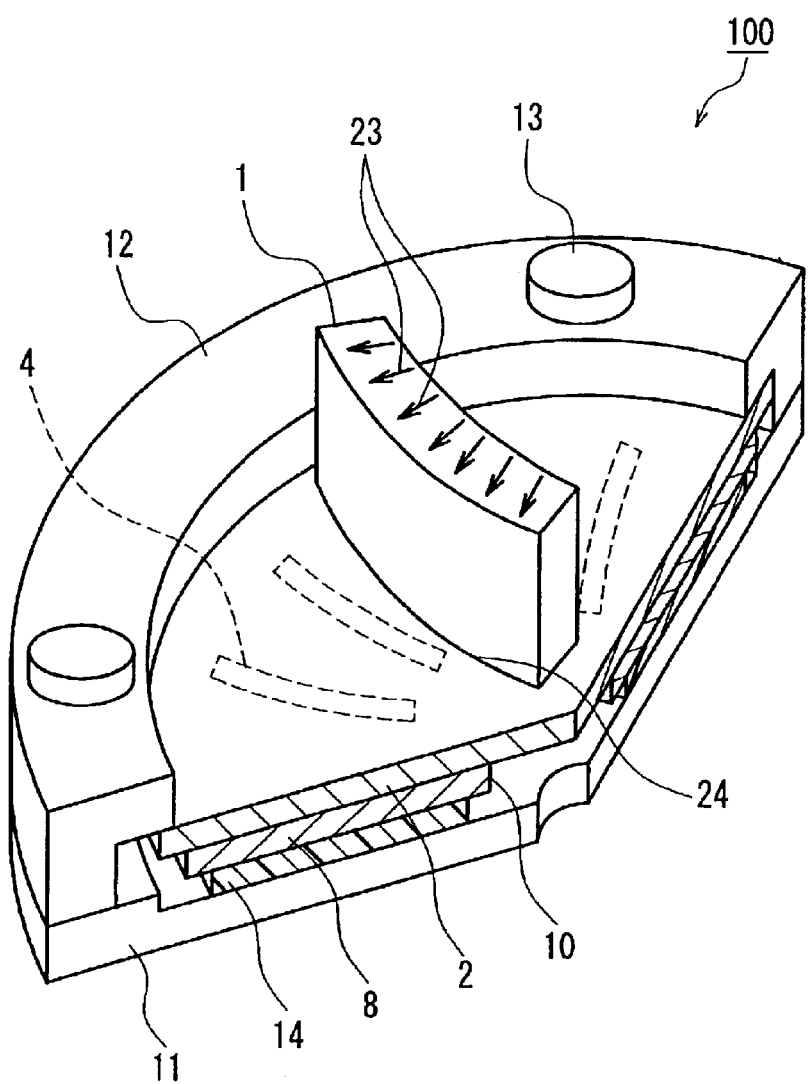
FIG. 2 is a cross-sectional perspective view showing a configuration of the master information magnetic recording apparatus according to the first embodiment.

FIG. 1 is a cross-sectional view showing a configuration of a master information magnetic recording apparatus 100 according to a first embodiment; and FIG. 2 is a cross-sectional perspective view thereof.

The master information recording medium 100 includes a master information carrier facing device 3. The information carrier facing device 3 has a substantially disk-shaped lower flange 11. On the upper surface of the lower flange 11, a substantially cylindrical shaped concave portion 22 is formed. At the center of the bottom surface formed on the concave portion 22, a cylindrical shaped hole is formed.

On the concave portion 22, a substantially disk-shaped elastic plate 14 is disposed. At the center of the elastic plate 14, a center hole 15 is formed so that the hole formed on the bottom surface of the concave portion 22 is exposed.

On the elastic plate 14, a disk-shaped magnetic disk 8 is mounted. At the center of the magnetic disk 8, a center hole 10 is formed so that the hole formed on the bottom surface of the concave portion 22 is exposed. On the surface of the magnetic disk 8 opposite side to the elastic plate 14, a recording surface is formed.

Figure 3:
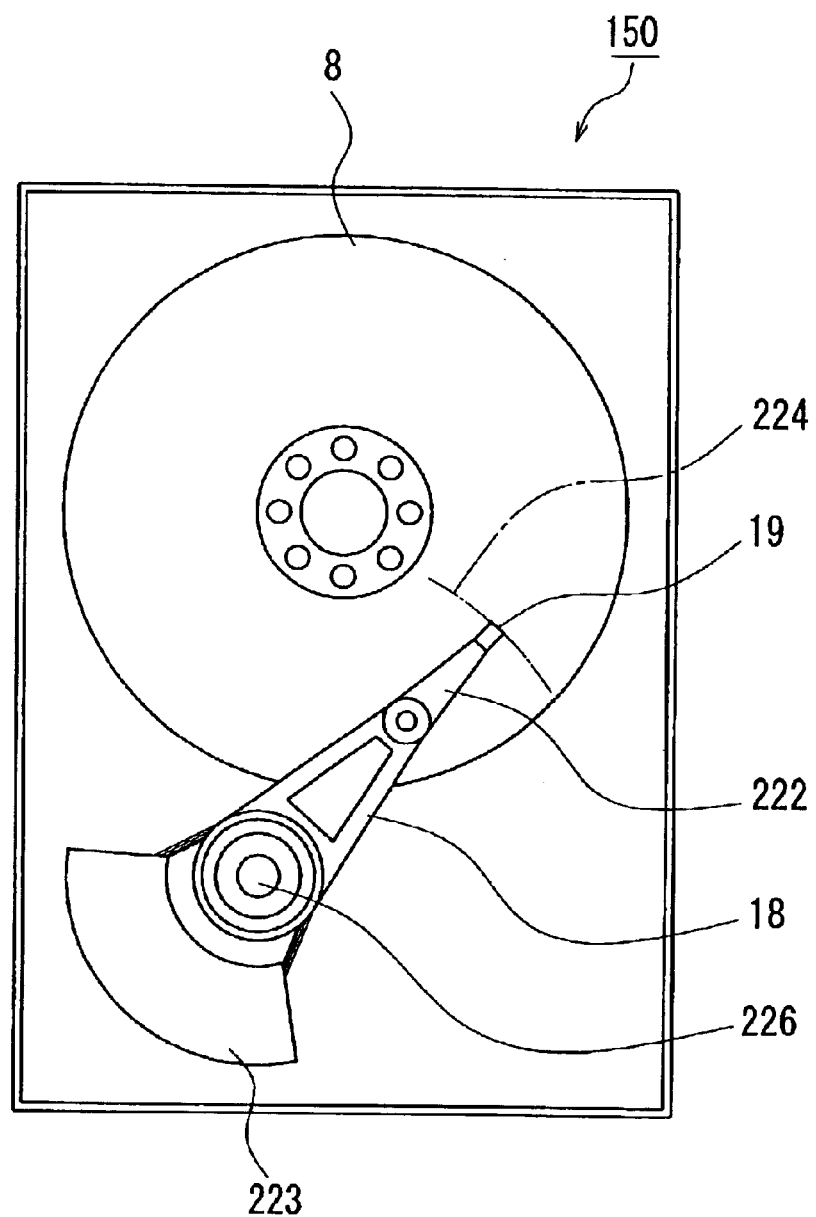
FIG. 3 is a plan view showing a configuration of a magnetic disk device provided with a magnetic disk in which master information is recorded by the master information magnetic recording apparatus according to the first embodiment.

FIG. 3 is a plan view showing a configuration of a magnetic disk apparatus 150 provided with the magnetic disk 8 in which master information is recorded by the master information magnetic recording apparatus 100. The magnetic disk 8 is driven to be rotated by a motor (not shown).

The magnetic disk apparatus 150 includes a head arm 18 pivotably provided around a pivot axis 226. At the tip of the head arm 18, a head suspension 222 is provided. At the tip of the head suspension 222, a magnetic head 19 is mounted. The magnetic head device 150 is provided with a voice coil motor 223 for driving the head arm 18 in a way in which the voice coil motor 223 is placed on the opposite side of the head arm 18 with respect to the pivot axis 226 disposed therebetween.

In the magnetic disk device 150 having such a configuration, when the head arm 18 is driven by the voice coil motor 223, the head arm 18 pivots around the pivot axis 226. Therefore, the magnetic head 19 mounted on the head suspension 222 moves on the magnetic disk 8 along an arc-shaped tracking scanning orbit 224 having the pivot axis 226 as its center.

Referring back to FIGS. 1 and 2, on the recording surface formed on the magnetic disk 8, a disk-shaped master information carrier 2 is mounted.

Figure 4:
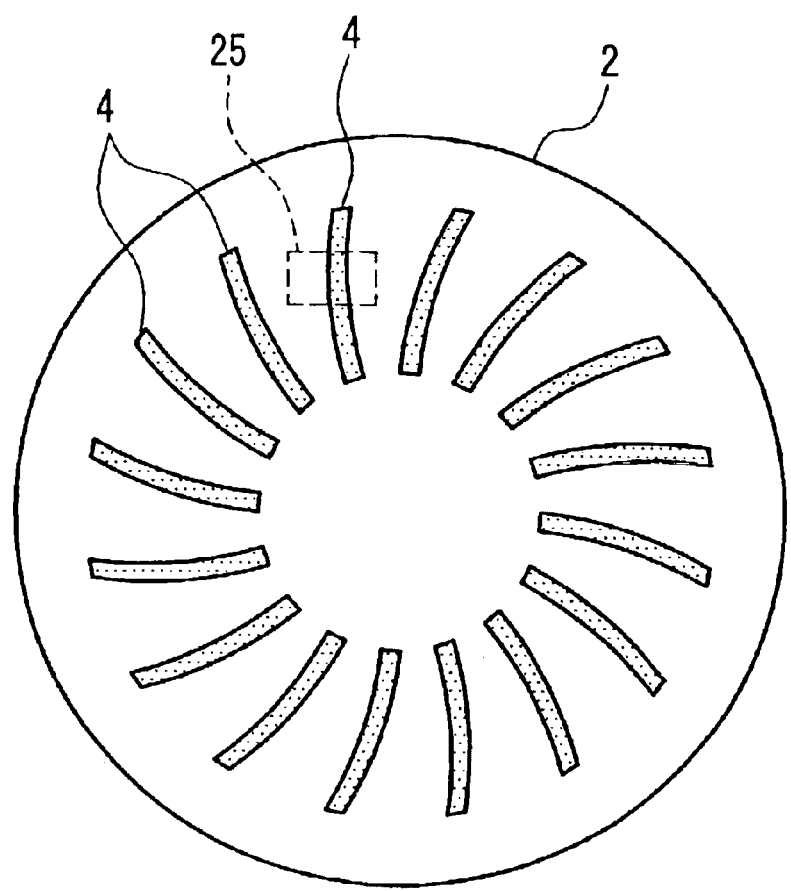
FIG. 4 is a plan view showing a configuration of a master information carrier provided for the master information magnetic recording apparatus according to the first embodiment.
Figure 5:
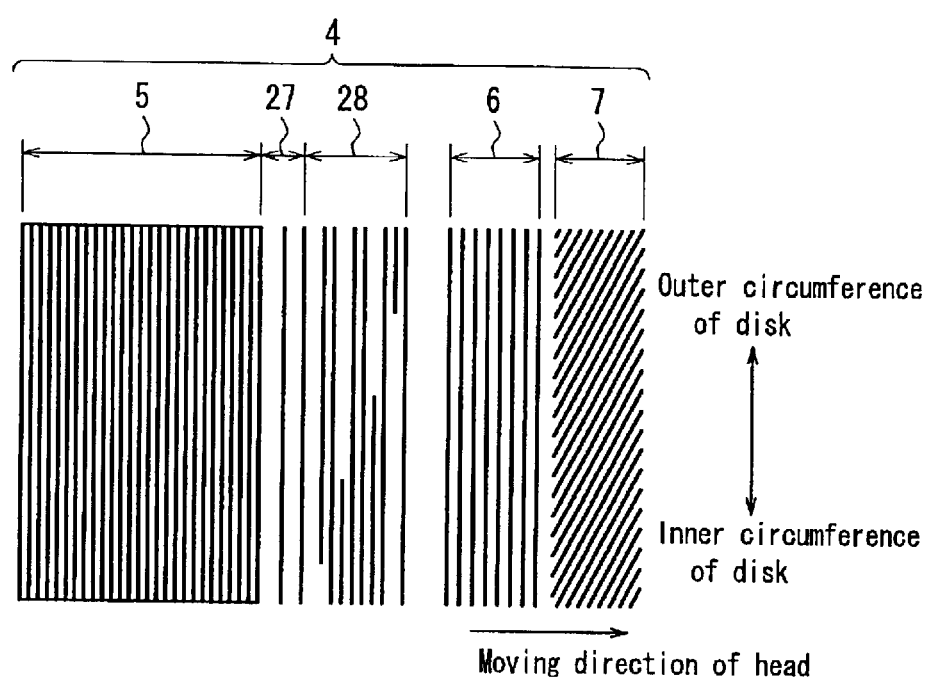
FIG. 5 is an enlarged view for explaining a configuration of a ferromagnetic thin film pattern formed on the master information carrier according to the first embodiment.

FIG. 4 is a plan view showing a configuration of the master information carrier 2; and FIG. 5 is an enlarged view for explaining a configuration of the ferromagnetic thin film pattern 4 formed on the master information carrier 2.

Hereinafter, a method for forming a ferromagnetic thin film pattern 8 having fine patterned indented surface corresponding to information signals on the surface of the master information carrier 2 is described. First, a ferromagnetic thin film made of cobalt (Co) or the like is formed on a surface of a substrate made of silicon (Si) wafer, glass, or the like, having a fine surface roughness and an excellent flatness, by a sputtering method. Next, a resist film is exposed and developed by a photolithographic method or another lithographic technique using a laser beam or an electron beam. Then, the patterned indented surface is formed by dry etching or the like. Alternatively, the patterned indented surface also can be formed by a so-called lift-off technology in which a resist film is formed on a surface of a substrate and is developed, a ferromagnetic thin film made of Co or the like is formed, and then the resist film is removed.

The method for forming the patterned indented surface on the master information carrier 2 is not limited to the aforementioned methods. For example, the fine pattern may be formed directly by using a laser, electron beam, or ion beam, or by machining.

Furthermore, the method for forming the ferromagnetic film on the surface of the glass substrate also is not limited to the sputtering method. For instance, general methods of forming thin films that have been carried out can be employed. An example of such a method includes vacuum deposition, ion plating, CVD, plating, or the like.

The material of the ferromagnetic film for forming the surfaces of the convex portion of the pattern on the master information carrier 2 is not limited to Co. Many kinds of magnetic materials can be used regardless of whether the material is a hard-magnetic material, a semihard magnetic material, or a soft magnetic material. In order to generate a sufficient recording magnetic field independently of the kind of magnetic recording medium into which master information signals are recorded, materials with higher saturation magnetic flux density are preferred.

Particularly, in a magnetic disk with a high coercive force over 2000 oersted and a flexible disk with a thick magnetic layer, sufficient recording cannot be performed at a saturation magnetic flux density of less than 0.8 tesla in some cases. Therefore, magnetic materials with a saturation magnetic flux density of 0.8 tesla or more, preferably 1.0 tesla or more, are generally used.

Furthermore, in order to enhance the adhesiveness to the magnetic disk, a part of the master information carrier on which the ferromagnetic film pattern 4 is not provided may be disposed lower than the surrounding portion to thus make a passage for evacuation by a suction device 16 (to be explained later).

Thus, on the surface of the master information carrier 2, the fine pattern corresponding to the preformat information signals are formed. As a whole, the ferromagnetic thin film patterns 4 provided with the convexoconcave corresponding to information signals are formed at predetermined angle intervals along a head orbit as shown in FIG. 4. FIG. 5 is an enlarged view showing a region 25 shown in FIG. 4 that is a part of the ferromagnetic thin film pattern 4 on which the convexoconcave corresponding to information signals are formed.

The ferromagnetic thin film pattern 4 includes a synchronous signal pattern 5, a sector mark pattern 27, an address information signal pattern 28, a servo signal pattern 6, and a servo signal pattern 7. All of the synchronous signal pattern 5, the sector mark pattern 27, the address information signal pattern 28, and the servo signal pattern 6 are formed along the head orbit. Therefore, these patterns have the same pattern angles at the same radial position.

The servo signal pattern 7 is formed to tilt with respect to the synchronous signal pattern 5, the sector mark pattern 27, the address information signal pattern 28 and the servo signal pattern 6. Therefore, the servo signal pattern 7 has a different pattern angle from those of the synchronous signal pattern 5, the sector mark pattern 27, the address information signal pattern 28 and the servo signal pattern 6.

Thus, the ferromagnetic thin film pattern 4 formed on the master information carrier 2 in the first embodiment includes not less than two kinds of patterns disposed sequentially along the direction of the relative movement of the magnetic head and the magnetic disk. These different patterns include two kinds of patterns having the different pattern angles mentioned above.

Note here, in FIG. 5, a bold solid line shows a part made of ferromagnetic materials such as Co, and the rest shows the part made of non ferromagnetic materials. However, the relationship may be opposite, that is, the bold solid line may show the part made of non ferromagnetic materials and the rest shows the part made of magnetic materials such as Co.

With reference back to FIG. 1, the master information carrier facing device 3 has an upper flange 12. The upper flange 12 is provided so as to press the edge on the upper surface of the master information carrier 2. The upper flange 12 and the lower flange 11 are connected to each other with bolts 13.

The master information magnetic recording apparatus 100 includes a suction device 16. The suction device 16 is provided in a way in which it is in communication with the center hole 15 formed in the elastic plate 14 and the center hole 10 formed in the magnetic disk 8 via a suction duct 17. The master information carrier 2 is drawn toward the side of the magnetic disk 8 via the suction duct 17, the center hole 15 and the center hole 10 so that the master information carrier 2 is brought into close contact with the magnetic disk 8.

Thus, with the upper flange 12 for pressing the edge of the upper surface of the master information carrier 2 and the suction device 16 for drawing the master information carrier 2 toward the side of the magnetic disk 8, the master information carrier 2 is brought into contact with the magnetic disk 8 uniformly.

The master information magnetic recording apparatus 100 includes a magnetic field applying unit 1. The magnetic field applying unit 1 is formed of a substantially fan-shaped permanent magnet and is disposed on the magnetic disk 8 with the master information carrier 2 disposed between the magnetic field applying unit 1 and the magnetic disk 8.

The magnetic field applying unit 1 applies a magnetic field to the ferromagnetic thin film patterns 4 formed on the master information carrier 2 and the magnetic disk 8 in order to record the information signals shown by the ferromagnetic thin film patterns 4 into the magnetic disk 8.

The surface of the magnetic field applying unit 1 facing the master information carrier 2 has a fan shape. One side 24 of the magnetic field applying unit 1 is a curve having a line showing the average direction of the pattern angle of the synchronous signal pattern 5 and the pattern angle of the servo signal pattern 7 as a tangent. A magnetizing direction 23 of the magnetic field applying unit 1 is parallel to the surface facing the master information carrier 2 and always perpendicular to one side 24 of the magnetic field applying unit 1. By using this magnetic field applying unit 1, at all of the radial positions of the disk the magnetic field can be applied in the direction normal to the line showing the average direction of the pattern angle of the synchronous signal pattern 5 and the pattern angle of the servo signal pattern 7.

Hereinafter, the direction in which a magnetic field is applied by the magnetic field applying unit 1 provided for the master information magnetic recording apparatus 100 according to the first embodiment will be explained. In order to determine the direction in which a magnetic field is applied, it is necessary to know the pattern angle. As examples of two patterns having different pattern angles in the same radial position, attention is paid toward the synchronous signal pattern 5 and the servo signal pattern 7. The synchronous signal pattern 5 is formed along the head orbit. Since the moving orbit of the magnetic head is an arc with the pivot axis 226 of a head actuator as its center, the pattern angle is defined by the radial position of the magnetic disk, the position of the pivot axis 226 of the head actuator, and the distance from the magnetic head to the pivot axis 226 of the head actuator.

In order to determine the pattern angle of the servo signal pattern 7, a tilt angle with respect to the synchronous signal pattern 5 is further taken account as a parameter.

Figure 6:
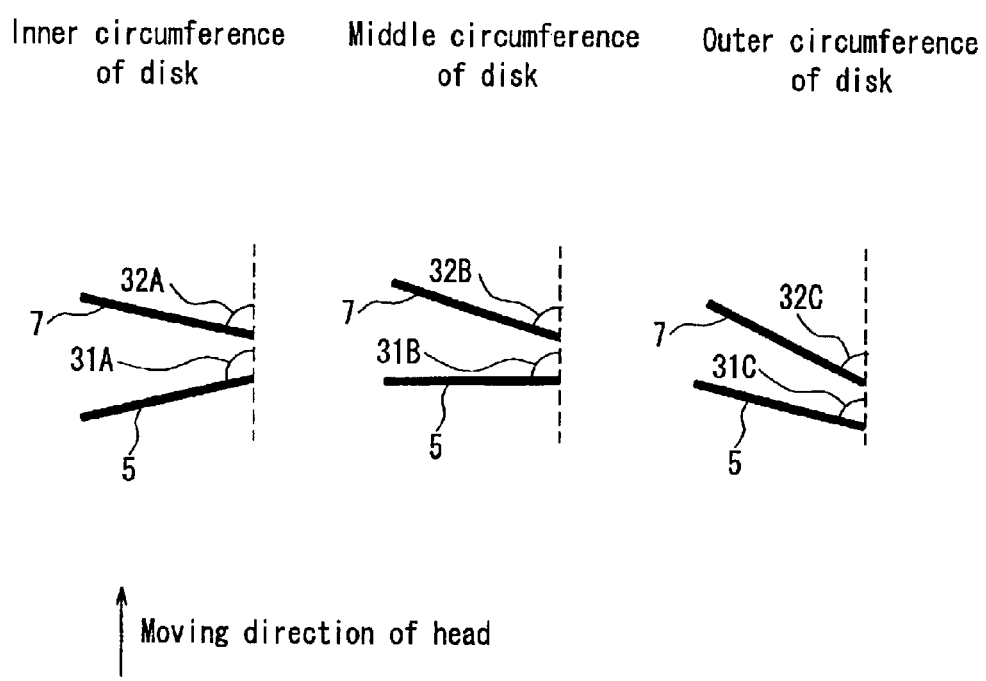
FIG. 6 is a schematic view for explaining pattern angles of the ferromagnetic thin film patterns formed on the master information carrier according to the first embodiment.

FIG. 6 schematically shows the relationship between the pattern angles of the ferromagnetic thin film patterns 8 formed on the master information carrier 2 and the radial position of the magnetic disk. As shown in FIG. 6, the pattern angles 31A, 31B and 31C of the synchronous signal pattern 5 change as the radial position moves from the inner circumference to the outer circumference of the disk. Also, the pattern angles 32A, 32B and 32C of the servo signal pattern 7 change as the radial position moves from the inner circumference to the outer circumference of the disk.

Figure 7:
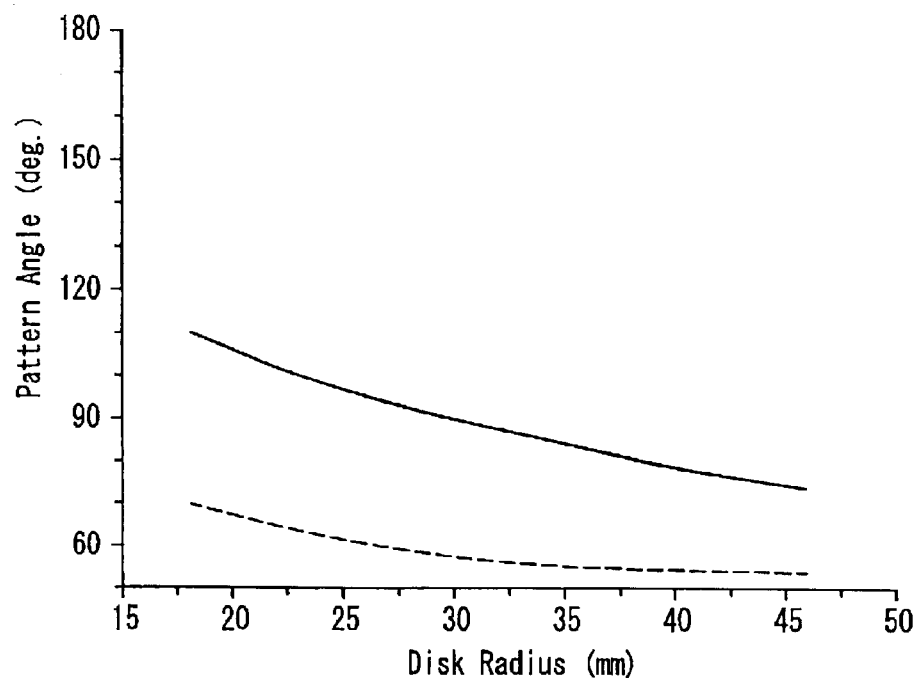
FIG. 7 is a graph showing the relationship between the pattern angle of the ferromagnetic thin film pattern and the radius of the disk according to the first embodiment.

A solid curve in FIG. 7 shows an example of the relationship between the pattern angle of the synchronous signal pattern 5 and the radius of the disk. A broken curve in FIG. 7 shows an example of the relationship between the pattern angle of the servo signal pattern 7 and the radius of the disk.

The magnetic field applying unit 1 of the first embodiment applies a magnetic field to the master information carrier 2 and the magnetic disk 8 along the direction perpendicular to the average direction of the direction shown by the pattern angle of the synchronous signal pattern 5 and the direction shown by the pattern angle of the servo signal pattern 7.

Figure 8:
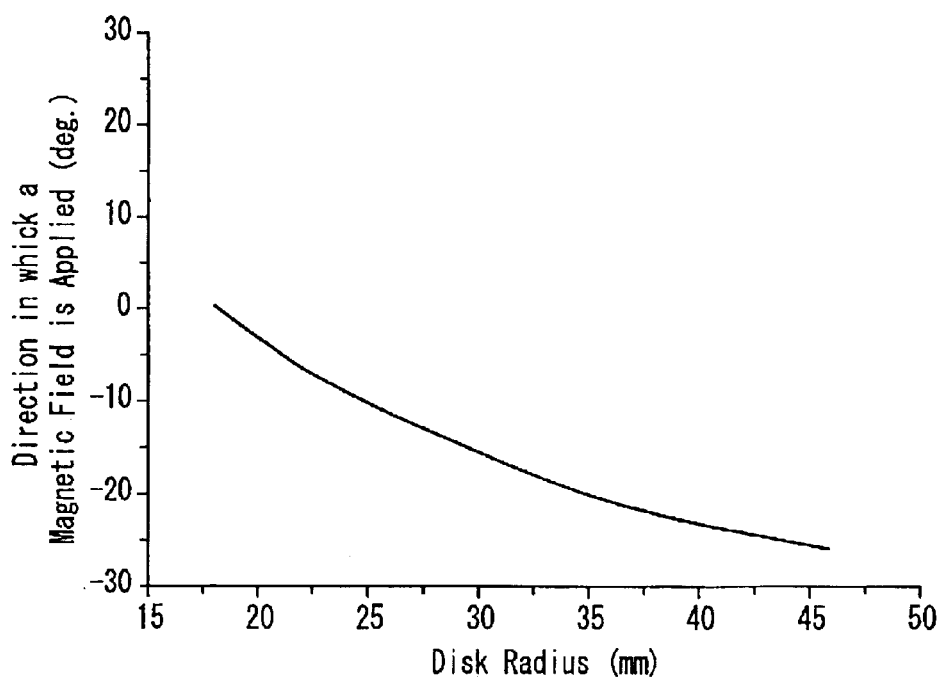
FIG. 8 is a graph showing the relationship between the direction in which a magnetic field is applied by a permanent magnet provided for the master information magnetic recording apparatus and the radius of the disk according to the first embodiment.
Figure 9:
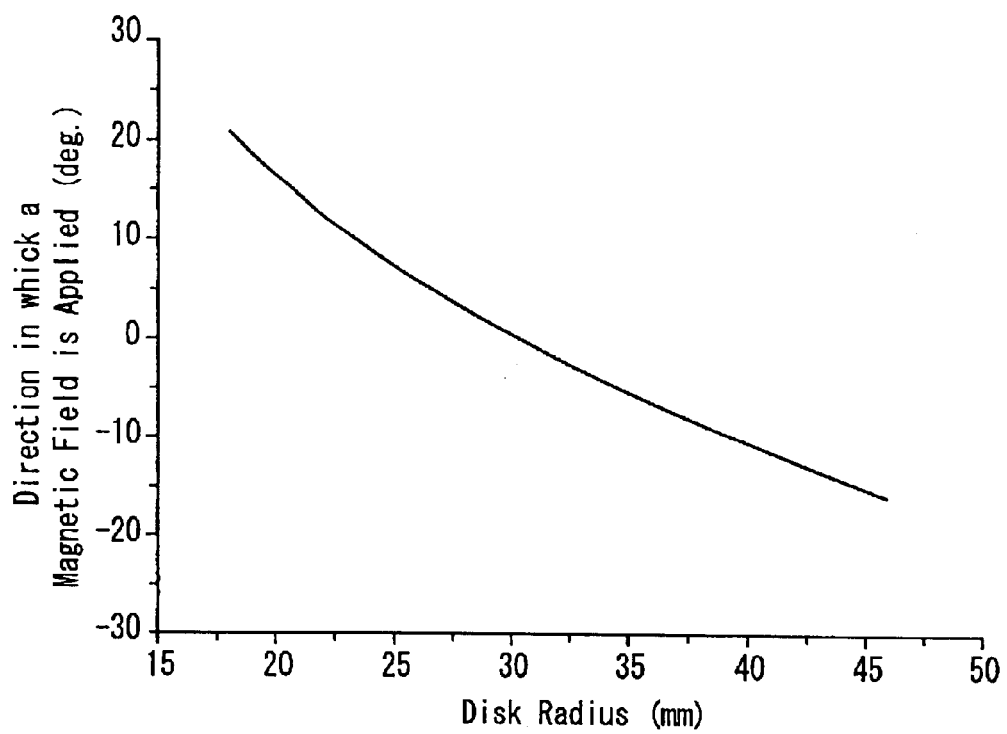
FIG. 9 is a graph showing the relationship between the direction in which a magnetic field is applied by a permanent magnet provided for a conventional master information magnetic recording apparatus and the radius of the disk.

FIG. 8 is a graph showing the relationship between the direction in which a magnetic field is applied by the magnetic field applying unit 1 and the radius of the disk according to the first embodiment. FIG. 9 is a graph showing the relationship between the direction in which a magnetic field is applied and the radial position when the direction perpendicular to the moving orbit of the magnetic head is made to be a direction in which a magnetic field is applied as in the prior art. In FIGS. 8 and 9, the abscissa shows the radial position of the magnetic disk and the ordinate shows the direction in which a magnetic field is applied by the magnetic field applying unit 1.

Figure 10:
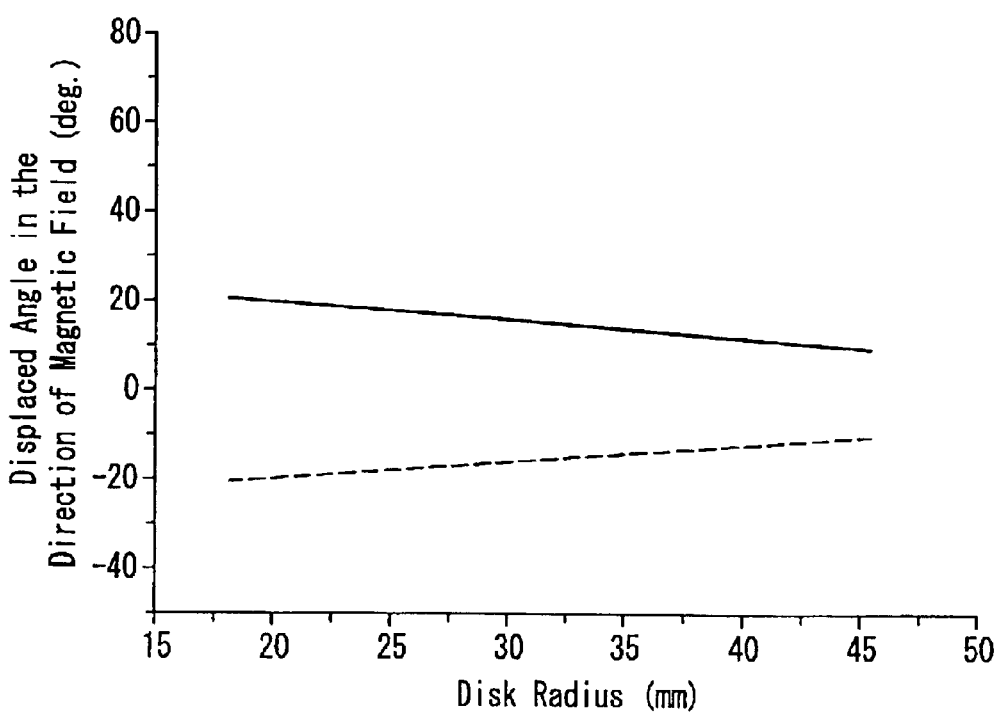
FIG. 10 is a graph showing the relationship between the displaced angle in the direction of the magnetic field and the radius of the disk in the master information magnetic recording apparatus according to the first embodiment.
Figure 11:
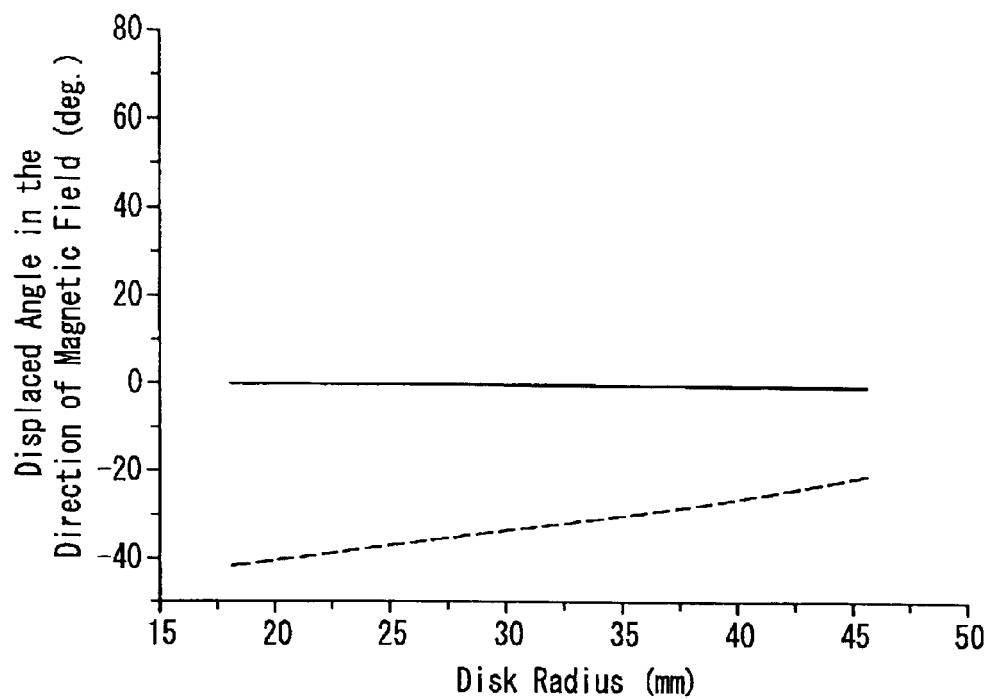
FIG. 11 is a graph showing the relationship between the displaced angle in the direction of the magnetic field and the radius of the disk in a conventional master information magnetic recording apparatus.

FIG. 10 is a graph showing an angle made by the direction in which a magnetic field is applied by the magnetic field applying unit 1 and the direction perpendicular to the edge of each of the ferromagnetic thin film patterns of the servo signal pattern 7 and the synchronous signal pattern 5 (displaced angle in the direction of a magnetic field) as a function of the radius of the disk. For comparison, a graph shows the displaced angle in the direction in which a magnetic field is applied as a function of the radius of the disk when the direction perpendicular to the moving orbit of the magnetic head is made to be a direction in which a magnetic field is applied as in the prior art. In FIGS. 10 and 11, a solid line shows the displaced angle between the direction perpendicular to the edge of the synchronous signal pattern 5 and the direction in which a magnetic field is applied; and a broken line shows the displaced angle between the direction perpendicular to the edge of the servo signal pattern 7 and the direction in which a magnetic field is applied.

In FIGS. 10 and 11, the angle shown in the ordinate is expressed with signed integers. However, regardless of the signs, the larger the absolute value of the displaced angle in the direction of the magnetic field is, the more significantly the reproduced signal is deteriorated. As shown in FIG. 11, in a conventional direction in which a magnetic field is applied, the displaced angle in the direction of the magnetic field of the servo signal pattern 7 is −41 degrees when the radius of the disk is 18 mm and the absolute value thereof is 41 degrees.

On the contrary, in the direction in which a magnetic field is applied in the first embodiment, as shown in FIG. 10, the displaced angle of the servo signal pattern 7 is −20 degrees and the absolute value thereof is 20 degrees.

Thus, according to the direction in which a magnetic field is applied in the first embodiment, the absolute value of the displaced angle in the direction of the magnetic field of the servo signal pattern 7 is reduced from the absolute value of the displaced angle in the direction of the magnetic field in the prior art. Therefore, it is possible to prevent the reproducing signal as to the servo signal pattern 7 from being deteriorated.

In other words, the maximum value of the angle made by the direction in which a magnetic field is applied and the direction perpendicular to the edge of the ferromagnetic thin film pattern in the master information magnetic recording apparatus in the first embodiment is smaller as compared with that of the prior art. Consequently, it is possible to minimize the phase disturbance of the signal and the reduction of the reproduction output and to carry out preformat recording capable of achieving the signal quality acceptable for practical use.

Furthermore, by using the direction in which a magnetic field is applied in this embodiment, it is possible to manufacture a highly reliable magnetic recording medium in which preformat recording was carried out.

The procedure for recording information signals corresponding to the patterns formed on the master information carrier 2 into the magnetic disk 8, that is a magnetic recording medium, is explained. In the first embodiment, as shown in FIG. 1, first, the magnetic disk 8 is brought into contact with the master information carrier 2 by using atmospheric pressure. Furthermore, the magnetic disk 8 is mechanically pressed onto the master information carrier 2, resulting in an entire and uniform contact between the magnetic disk 8 and the master information carrier 2.

Thereafter, by magnetizing the ferromagnetic thin film on the convex portion of the patterns formed on the master information carrier 2 by the use of the magnetic field applying unit 1 made of a permanent magnet, preformat information signals corresponding to the patterns are recorded into the magnetic disk 8. Hereinafter, the recording procedures will be explained in detail.

Figure 12:
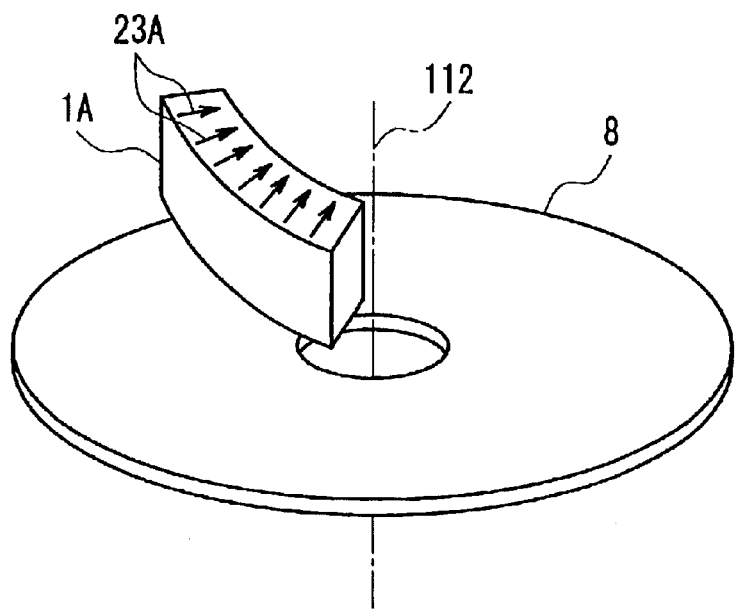
FIG. 12 is a perspective view for explaining an example of a method of initial magnetization of a magnetic disk according to the first embodiment.

FIG. 12 is a perspective view for explaining an example of a method of the initial magnetization of the magnetic disk according to the first embodiment.

As shown in FIG. 12, a permanent magnet 1A is rotated in parallel to the magnetic disk 8 around a center axis 112 of the magnetic disk 8, which is indicated with an alternating long and short dash line, with the permanent magnet 1A positioned close to the magnetic disk 8, thereby magnetizing the magnetic disk 8 in advance initial magnetization). The permanent magnet 1A may have the same shape as that of the magnetic field applying unit 1 formed of a permanent magnet used in recording preformat information signals. It is desirable that the magnetizing direction 23A of the permanent magnet 1A is opposite to the magnetizing direction 23 of the permanent magnet 1. Thus, the direction of a magnetic field at the time of initialization can be opposite to the transfer field.

Next, as shown in FIG. 1, the elastic plate 14, the magnetic disk 8, and the master information carrier 2 are superposed on the lower plate 11 sequentially so that the surface of the master information carrier 2 on which the pattern is formed and the recording surface of the magnetic disk 2 are brought into contact with each other.

Next, the suction device 16 is started. Thus, air between the master information carrier 2 and the magnetic disk 8 is sucked out through the center hole 10 of the magnetic disk 8 and the center hole 15 of the elastic plate 14, and an atmospheric pressure acts on the center portion of the master information carrier 2.

In this state, only the vicinity of the center portion of the master information carrier 2 is in contact with the magnetic disk 8, and the master information carrier 2 and the magnetic disk 8 may not be in secure contact with each other at their periphery. In order to obtain a secure contact between them at their periphery in the first embodiment, the upper flange 12 is placed on the upper surface of the master information carrier 2 at the edge, and the upper flange 12 and the lower flange 11 are fixed to each other with the bolts 13. In this case, by adjusting the fastening torque of the bolts 13, the magnetic disk 8 and the master information carrier 2 are pressed and come into contact with each other appropriately, resulting in a uniform contact between them. Finally, the magnetic field applying unit 1 made of a permanent magnet is rotated in parallel to the master information carrier 2 around the alternating long and short dash line shown in FIG. 1 as its rotation center, thus applying a direct exciting magnetic field to the master information carrier 2. Consequently, the ferromagnetic thin film convex portions of the master information carrier 2 are magnetized, thus recording preformat information signals corresponding to the pattern into the magnetic disk 8.

As described. above, in the first embodiment, the direction of the magnetic field generated by the magnetic field applying unit 1 makes the direction, which is a direction of the normal to the line showing the average direction of the pattern angles of the ferromagnetic thin film patterns of selected two kinds of patterns each having a different pattern angle, to be a transfer field. As a result, since it is possible to minimize the angle made by the direction of the magnetic field and the direction perpendicular to the edge of the ferromagnetic thin film on the master carrier, the phase disturbance of the signal or the reduction of the reproduction output can be minimized, thus enabling the preformat recording capable of achieving the quality of signals acceptable for practical use.

As mentioned above, according to the first embodiment, the ferromagnetic thin film pattern 4 formed on the surface of the master information carrier 2 includes a synchronous signal pattern 5 formed along a head orbit pivotably mounted on the arm pivots, and a servo signal pattern 7 formed along the direction that crosses to the tangential direction of the arc. The direction perpendicular to the tangential direction of the arc is referred to a first direction and the direction perpendicular to the crossing direction is referred to as a second direction. Based on the first direction and the second direction, a magnetic field is applied along the direction that is defined so that the signal represented by the servo signal pattern 7 reproduced by the magnetic disk 8 is increased.

Therefore, it is possible to increase the reproduction output of the signal represented by the servo signal pattern 7 reproduced from the magnetic disk 8. Consequently, it is possible to provide a master information magnetic recording apparatus enabling the highly reliable preformat recording into the magnetic recording medium.

Note here that an example of the configuration in which the master information carrier facing device 3 having the lower flange 11 and the upper flange 12 is provided was explained. However, the present invention is not limited to this, and any other devices can be employed as long as the device has a configuration capable of bringing the master information carrier 2 into contact with the magnetic disk 8 excellently.

Figure 13:
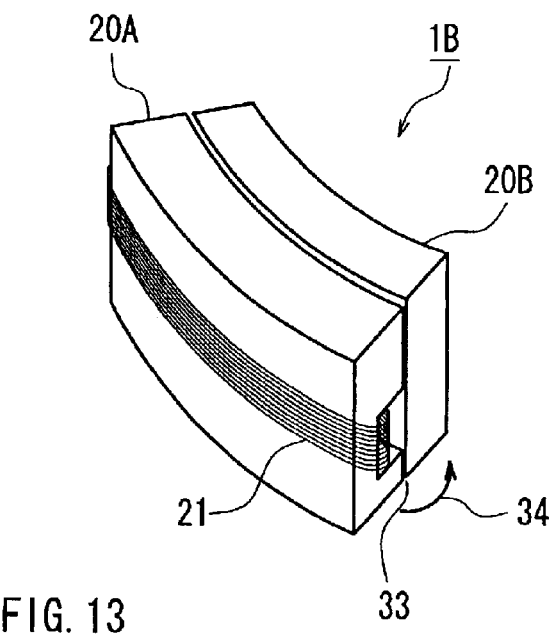
FIG. 13 is a perspective view for explaining a magnetic core and a coil provided for the master information magnetic recording apparatus according to the first embodiment.

FIG. 13 is a perspective view for explaining another magnetic field applying unit 1B provided for the master information magnetic recording apparatus. The magnetic field applying unit 1B has a pair of magnetic cores 20A and 20B and a coil 21 wound around one core 20A. Between the pair of magnetic cores 20A and 20B, a gap 33 along an arc orbit having a line showing the average direction of the pattern angle of the synchronous signal pattern 5 and the pattern angle of the servo signal pattern 7 as a tangent is formed. A leakage magnetic field 34 is generated from the magnetic core 20A toward the magnetic core 20B beyond the gap 33.

Instead of the coil 21, at least one of the two cores (20A, 20B) may be made of a permanent magnet to generate a leakage magnetic field beyond the gap.

In these cases, the magnetic field generated by the current supplied to the coil 21 or the magnetic field generated by the permanent magnet are induced to the gap 34 facing the master information carrier by the magnetic cores 20A and 20B. The leakage magnetic field 34 from the gap 33, by the above-mentioned shape, can apply a magnetic field along the direction of the normal to the line showing the average direction of the pattern angle of the synchronous signal pattern 5 and the pattern angle of the servo signal pattern 7 in all the radial positions of the disk.

Furthermore, the magnetic field applying unit may include a pair of rod-shaped magnetic substances facing each other with a gap along the arc orbit having a line showing the average direction of the synchronous signal pattern 5 and the servo signal pattern 7 as a tangent and a permanent magnet connected to the rod-shaped magnetic substances (not shown).

(Second Embodiment)

Figure 14:
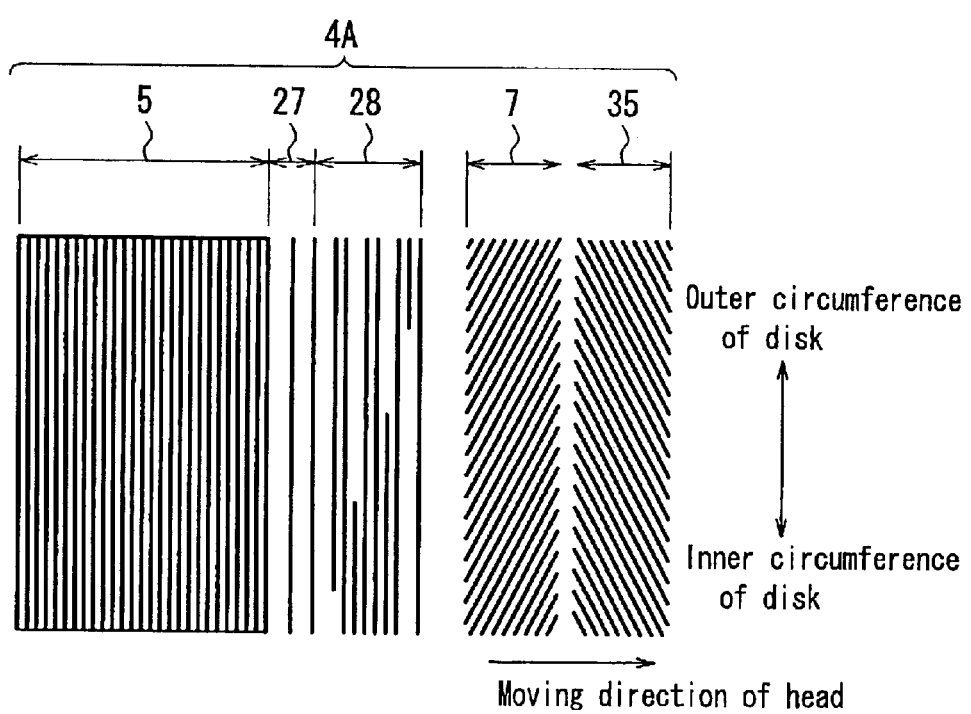
FIG. 14 is an enlarged view for explaining a configuration of another ferromagnetic thin film pattern formed on a master information carrier according to a second embodiment of the present invention.

FIG. 14 is an enlarged view for explaining a configuration of another ferromagnetic thin film pattern 4A formed on the master information carrier. The component elements that are the same as those of the ferromagnetic thin film pattern 4 explained with reference to FIG. 5 in the first embodiment are given the same reference numbers. Therefore, the detailed explanation thereof is omitted herein. The difference between the ferromagnetic thin film pattern 4A of this embodiment and that of the above-mentioned ferromagnetic thin film pattern 4 is that a servo signal pattern 35 is further formed and the servo signal pattern 6 is not formed in this embodiment.

As shown in FIG. 14, the tilting direction of the servo signal pattern 35 is opposite to that of the servo signal pattern 7. As a result, when the magnetic head moves toward the external side of the magnetic disk, the phase of the reproducing signal tends to be late in the servo signal pattern 7 but tends to be fast in the servo signal pattern 35 with respect to the synchronous signals. Therefore, by detecting the phase difference between the servo signal pattern 7 and the servo signal pattern 35, the change of the phase difference due to the change of the position of the magnetic head in the radial direction becomes larger than that of the preformat pattern shown in above-mentioned FIG. 5 and it is possible to detect the change in the position of the magnetic head with higher sensitivity. Consequently, it is possible to control the position of the magnetic head with higher accuracy.

In this ferromagnetic thin film pattern 4A, all of the synchronous signal pattern 5, the sector mark pattern 27, and the address information signal pattern 28 are formed along the head orbit. Therefore, these patterns have the same pattern angles at the same radial position.

However, the servo signal pattern 7 and the servo signal pattern 35, etc. are patterns formed tilting with respect to the synchronous signal pattern 5. Therefore, the pattern angles thereof are different. Furthermore, as mentioned above, the servo signal pattern 7 and the servo signal pattern 35 have different pattern angles from each other.

Note here, in FIG. 14, a bold solid line shows a part made of ferromagnetic materials such as Co, and the rest shows the part made of non ferromagnetic materials. However, the relationship may be opposite.

Herein, as three patterns having different pattern angles at the same radial position, attention is paid toward the synchronous signal pattern 5, the servo signal pattern 7 and the servo signal pattern 35. The synchronous signal pattern 5 is formed along the moving orbit of the magnetic head. The moving orbit of the magnetic head is an arc having a pivot axis 226 of a head actuator as its center.

On the other hand, in order to determine the pattern angle of the servo signal pattern 35, similar to the servo signal pattern 7, a tilt angle with respect to the synchronous signal pattern 5 is further taken into account as a parameter. Herein, the time in which a magnetic head moves on the servo signal pattern 35 is constant in an arbitrary radial position similar to the other patterns.

Figure 15:
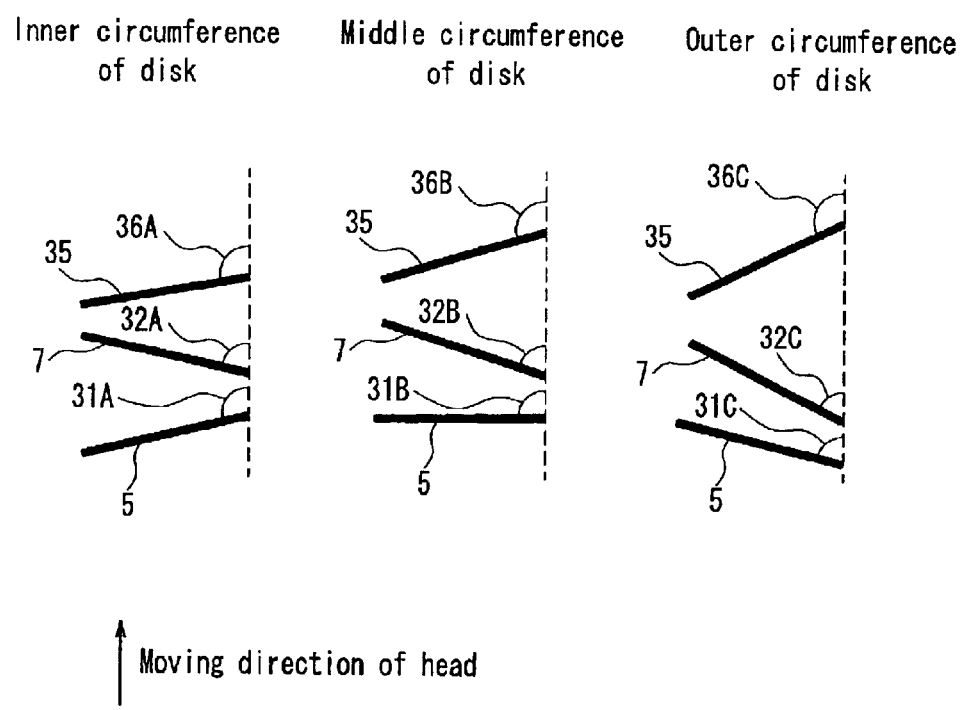
FIG. 15 is a schematic view for explaining pattern angles of another ferromagnetic thin film pattern formed on the master information carrier according to the second embodiment.

FIG. 15 is a schematic view for explaining pattern angles of another ferromagnetic thin film pattern 4A. The component elements that are the same as those of the ferromagnetic thin film pattern 4 explained with reference to FIG. 6 are given the same reference numbers, and therefore the detailed explanation therefor is omitted herein.

Figure 16:
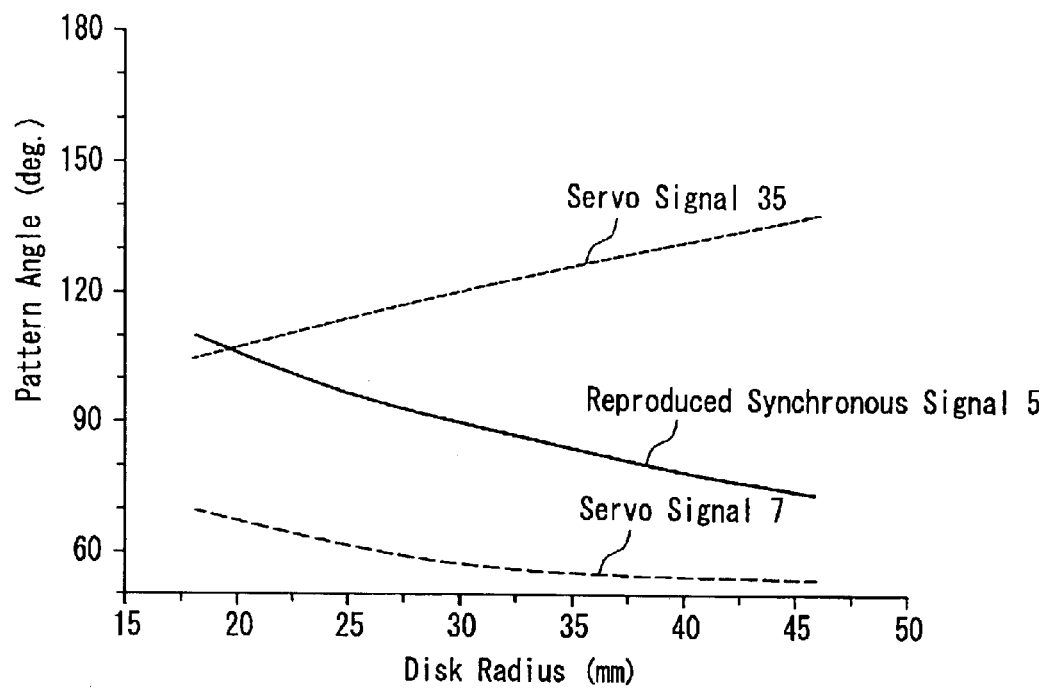
FIG. 16 is a graph showing the relationship between the pattern angle of another ferromagnetic thin film pattern and the radius of the disk according to the second embodiment.

FIG. 16 is a graph showing the relationship between the pattern angle of another ferromagnetic thin film pattern 4A and the radius of the disk. The pattern angles 31A, 31B, and 31C of the synchronous signal pattern 5 change as the radial position moves from the inner circumference to the outer circumference of the disk as shown in a solid curve shown in FIG. 16. The pattern angles 32A, 32B, and 32C of the servo signal pattern 7 change as the radial position moves from the inner circumference to the outer circumference of the disk as shown in a broken curve shown in FIG. 16.

The pattern angles 36A, 36B, and 36C of the servo signal pattern 35 change as the radial position moves from the inner circumference to the outer circumference of the disk as shown in another broken curve shown in FIG. 16.

Figure 17:
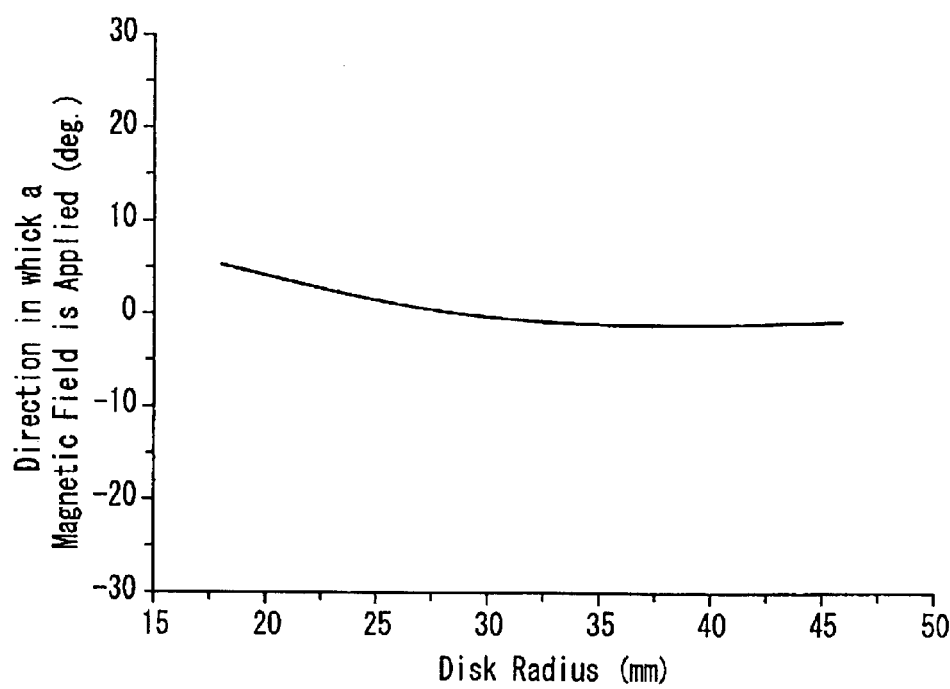
FIG. 17 is a graph showing the relationship between the direction in which a magnetic field is applied by another permanent magnet provided for the master information magnetic recording apparatus and the radius of the disk according to the second embodiment.

FIG. 17 is a graph showing the relationship between the direction in which a magnetic field is applied by another permanent magnet provided for the master information magnetic recording apparatus and the radius of the disk. The direction in which a magnetic field is applied is a direction perpendicular to the direction of the average direction of the pattern angle of the synchronous signal pattern 5, the pattern angle of the servo signal pattern 7, and the pattern angle of the servo signal pattern 35.

Figure 18:
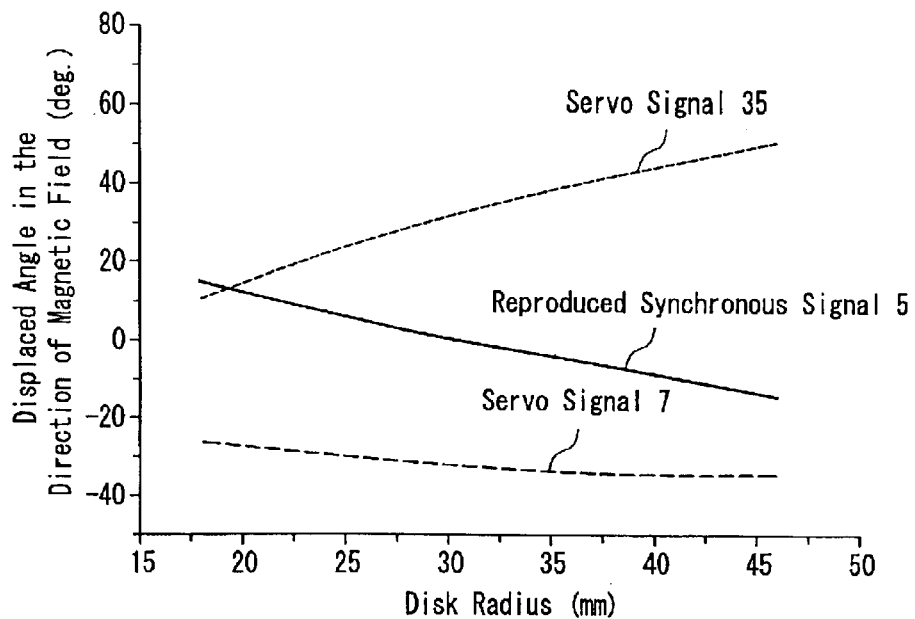
FIG. 18 is a graph showing the relationship between the displaced angle in the direction of the magnetic field and the radius of the disk in the master information magnetic recording apparatus according to the second embodiment.
Figure 19:
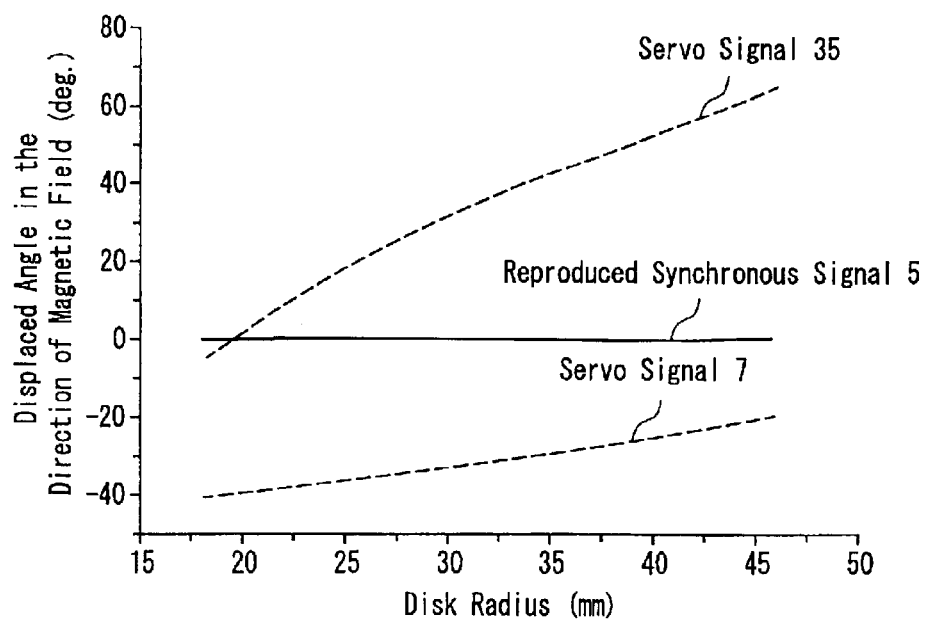
FIG. 19 is a graph showing the relationship between the displaced angle in the direction of the magnetic field and the radius of the disk in a conventional master information magnetic recording apparatus.

FIG. 18 is a graph showing the relationship between the displaced angle in the direction of the magnetic field and the radius of the disk in the master information magnetic recording apparatus according to the second embodiment; and FIG. 19 is a graph showing the relationship between the displaced angle in the direction of the magnetic field and the radius of the disk in a conventional master information magnetic recording apparatus.

As shown in FIG. 19, in the conventional direction the magnetic field is applied, the displaced angle of the direction of the magnetic field as to the servo signal pattern 35 is 64 degrees when the radius is 46 mm. On the other hand, as shown in FIG. 18, the displaced angle in the direction in which a magnetic field is applied in the second embodiment becomes maximal as well when the radius of the servo signal pattern 35 is 46 mm. However, even at this time, the displaced angle is reduced to about 50 degrees, which is much smaller angle than 64 degrees in the prior art.

In other words, the direction in which a magnetic field is applied in the master information magnetic recording apparatus according to the second embodiment, as compared with the conventional direction in which a magnetic field is applied, the displaced angle of the servo signal pattern 35 in the direction of the magnetic field becomes smaller. Consequently, it is possible to minimize the phase disturbance of the signal and the reduction of the reproduction output with respect to the servo signal pattern 35 and it is possible to carry out preformat recording capable of achieving the quality of signals acceptable for practical use.

In order to make the direction in which a magnetic field is applied to be the direction of the normal to the line showing the average direction of the pattern angles of the synchronous signal pattern 5, the servo signal pattern 7 and the servo signal pattern 35 as mentioned above, in the permanent magnet constituting the magnetic field applying unit 1 shown in FIG. 2, one side 24 of the permanent magnet may be formed so that it has a line showing the average direction of the pattern angles of the synchronous signal pattern 5, the servo signal pattern 7, and the servo signal pattern 35 as a tangent. Alternately, in the magnetic field applying unit 1B shown in FIG. 13, the center line of the gap 33 facing the master information carrier 2 is allowed to coincide with the tangent showing the direction of the average direction of the pattern angles of the synchronous signal pattern 5, the servo signal pattern 7, and the servo signal pattern 35. At this time, as the means for generating a magnetic field, a permanent magnet may be used instead of coil 21.

(Third Embodiment)

Figure 20:
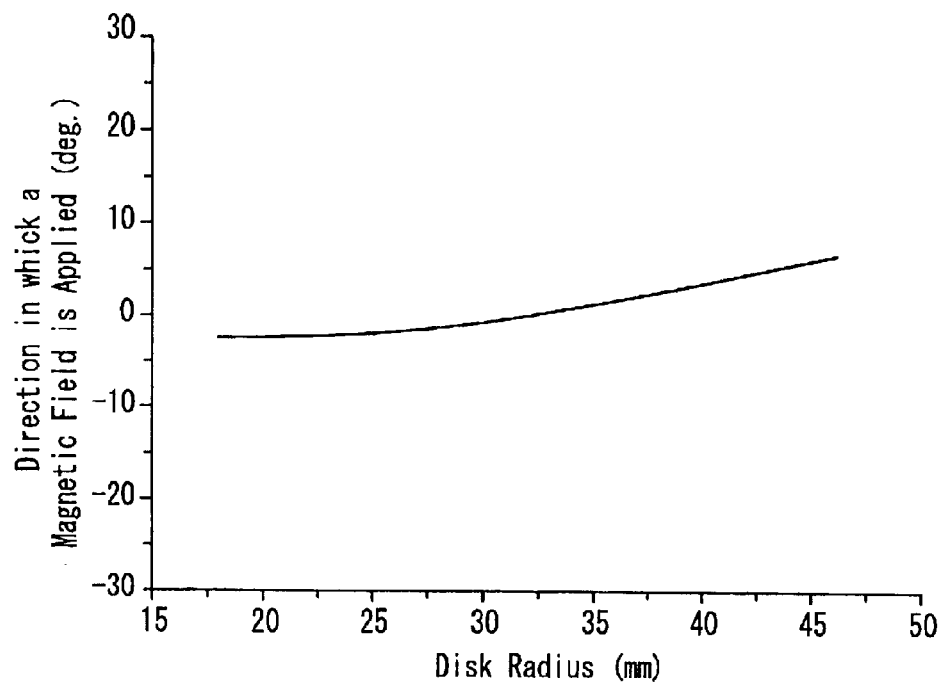
FIG. 20 is a graph showing the relationship between the direction in which a magnetic field is applied by a further permanent magnet provided for the master information magnetic recording apparatus and the radius of the disk according to a third embodiment of the present invention.

FIG. 20 is a graph showing the relationship between the direction in which a magnetic field is applied by a further permanent magnet provided for the master information magnetic recording apparatus and the radius of the disk. FIG. 20 shows the relationship between the direction in which a magnetic field is applied and the radial position when the direction in which a magnetic field is applied is defined to be a direction perpendicular to the average direction of the servo signal pattern 7 and the servo signal pattern 35. Two patterns may be selected from the all kinds of ferromagnetic film patterns so that the displaced angle between the two patterns is the largest.

Figure 21:
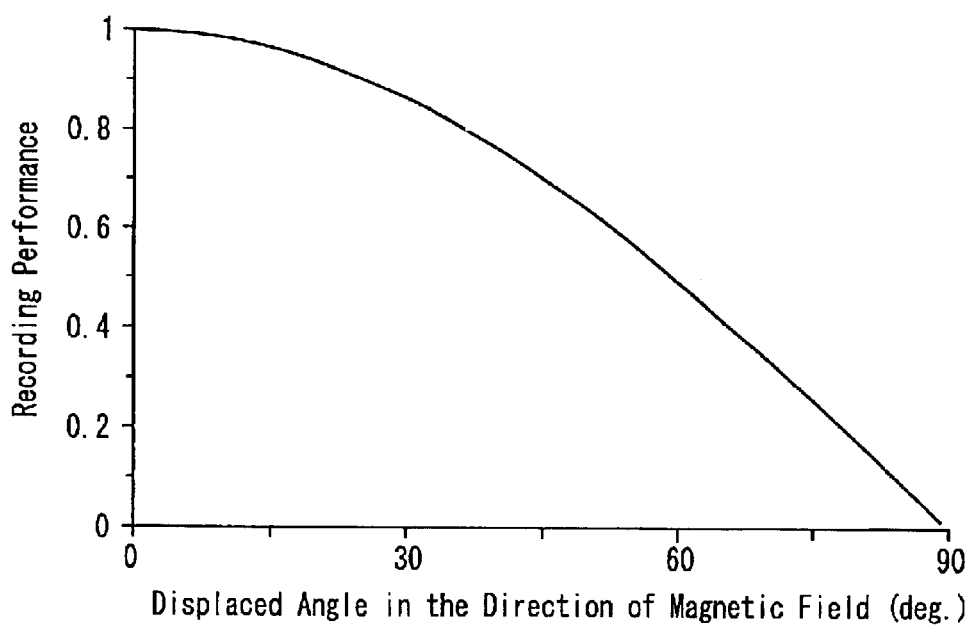
FIG. 21 is a graph showing the relationship between the recording performance and the displaced angle in the direction of the magnetic field in the master information magnetic recording apparatus according to the third embodiment.

FIG. 21 is a graph showing the simulation result of the relationship between the recording performance of the master information magnetic recording apparatus and the displaced angle in the direction of the magnetic field. The abscissa shows the displaced angle in the direction of the magnetic field and the ordinate shows the recording performance. As the displacement of the displaced angle in the direction of the magnetic field becomes larger, the recording performance is lowered.

Figure 22:
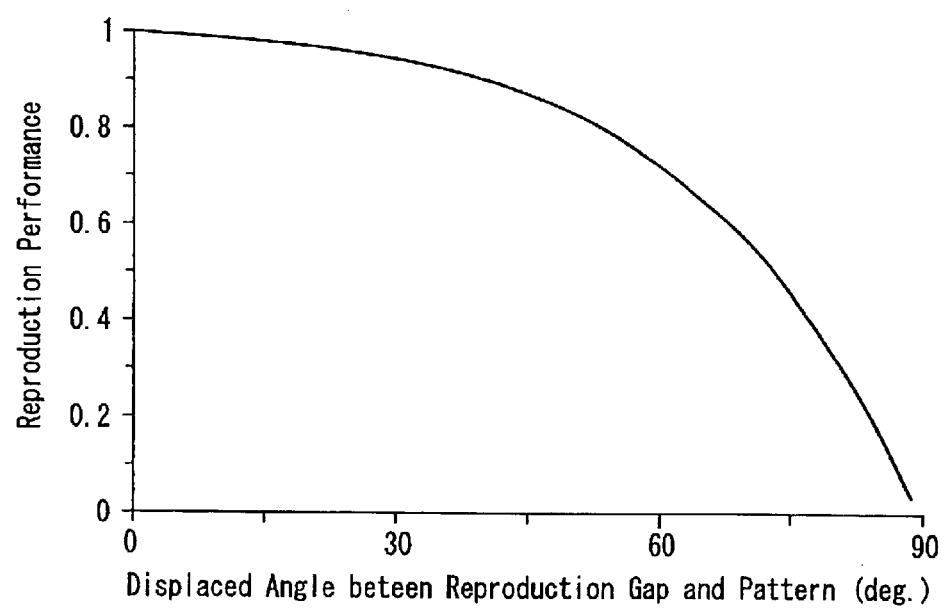
FIG. 22 is a graph showing the relationship between the reproduction performance and the displaced angle of a reproduction gap with respect to a pattern when reproducing a magnetic disk in which information is recorded by the master information magnetic recording apparatus according to the third embodiment.

FIG. 22 is a graph showing the relationship between the reproducing performance when the magnetic disk recorded by the master information magnetic recording apparatus is reproduced and the displaced angle between the reproducing gap and the pattern. The abscissa shows the displaced angle between the reproducing angle and the pattern; and the ordinate shows the reproducing performance. As the displaced angle between the reproducing gap and the pattern becomes larger, the reproducing performance is lowered.

Figure 23:
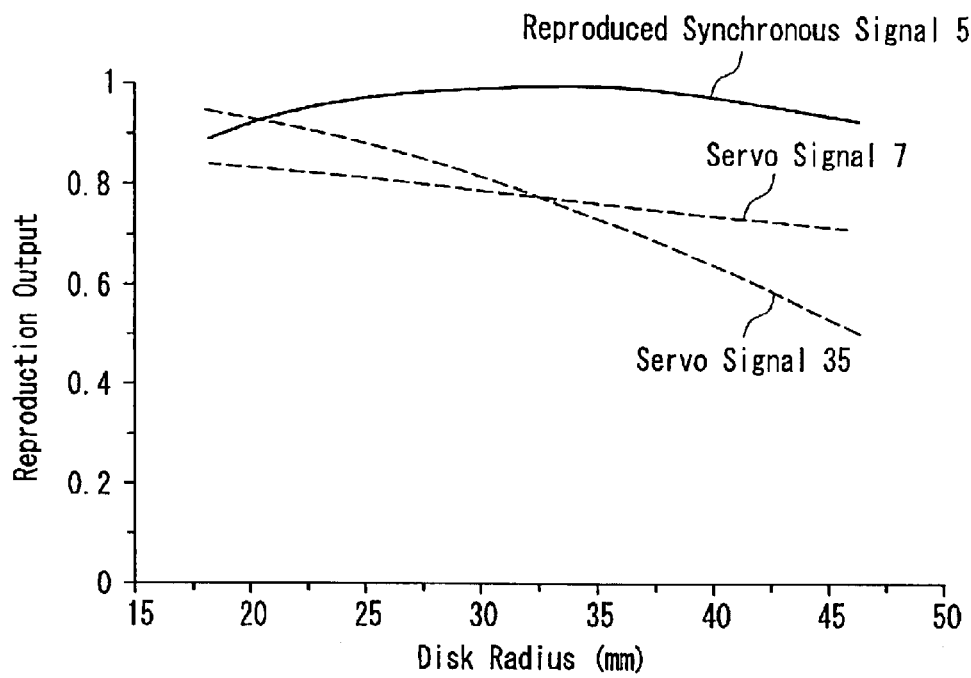
FIG. 23 is a graph showing the relationship between the reproduction output and the radius of the disk when reproducing the magnetic disk recorded by the master information magnetic recording apparatus according to the third embodiment.
Figure 24:
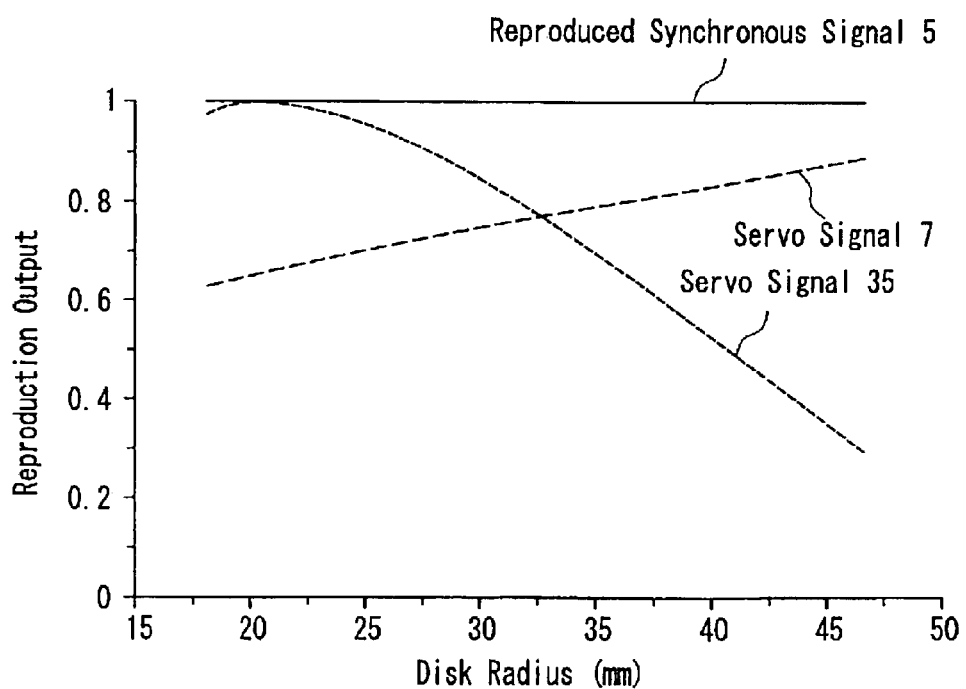
FIG. 24 is a graph showing the relationship between the reproducing performance and the radius of the disk when reproducing the magnetic disk recorded by a conventional master information recording apparatus.

FIG. 23 is a graph showing the relationship between the reproduction output and the radius of the disk when reproducing the magnetic disk recorded, using the distribution of directions in which a magnetic field is applied shown in FIG. 20, by the master information magnetic recording apparatus according to the third embodiment. FIG. 24 is a graph showing the relationship between the reproducing performance and the radius of the disk when reproducing the magnetic disk recorded by a conventional master information recording apparatus.

FIG. 23 shows the reproduction output of the synchronous signal pattern 5, the servo signal pattern 7 and the servo signal pattern 35 when a magnetic field is applied along the direction perpendicular to the average direction of the pattern angle of the servo signal pattern 7 and the pattern angle of the servo signal pattern 35. FIG. 24 shows the reproduction output of the synchronous signal pattern 5, the servo signal pattern 7 and the servo signal pattern 35 when a magnetic field is applied along the direction perpendicular to the pattern angle of the synchronous signal pattern 5 in conventional case.

In the prior art, as shown in FIG. 24, the reproduction output of the servo signal pattern 35 is lowered to about 0.3 when the disk radius is about 46 mm. On the other hand, according to the third embodiment, as shown in FIG. 23, the reproduction output of the servo signal pattern 35 is lowered to only about 0.5 when the disk radius is 46 mm.

Figure 25:
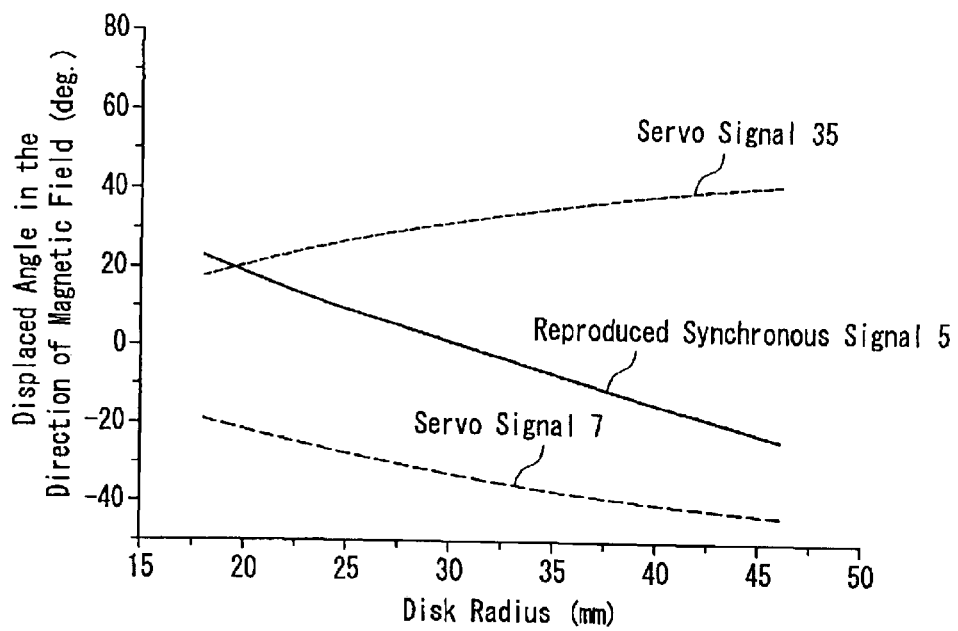
FIG. 25 is a graph showing the relationship between the displaced angle in the direction of the magnetic field and the radius of the disk in the master information magnetic recording apparatus according to the third embodiment.

FIG. 25 is a graph showing the relationship between the displaced angle in the direction of the magnetic field and the radius of the disk in the master information magnetic recording apparatus according to the third embodiment.

FIG. 25 shows the angle (displaced angle in the direction of the magnetic field) made by the direction in which a magnetic field is applied and the direction perpendicular to each of the edges of the synchronous signal pattern 5, the servo signal pattern 7 and the servo signal pattern 35 as a function of the radial position of the disk, when the direction in which a magnetic field is applied is determined to the direction perpendicular to the average direction of the servo signal pattern 7 and the servo signal pattern 35 that is a combination of the ferromagnetic thin film patterns making the largest pattern angle.

As shown in the above-mentioned FIG. 19, in a conventional direction in which a magnetic field is applied, the displaced angle of the servo signal pattern 35 becomes 64 degrees when the radius is 46 mm. On the other hand, in the direction in which a magnetic field is applied in the third embodiment, the displaced angle between the servo signal pattern 7 and the servo signal pattern 35 becomes maximum as shown in FIG. 25, when the radius is 46 mm. However, even at this time, the displaced angles are reduced to about 42 degrees respectively, which are much smaller angles than 64 degrees in the prior art.

In other words, in the direction in which a magnetic field is applied in the master information magnetic recording apparatus according to the third embodiment, as compared with a conventional direction in which a magnetic field is applied, an angle made by the direction in which a magnetic field is applied and the direction perpendicular to the edge of the servo signal pattern 7 becomes smaller. Consequently, it is possible to minimize the phase disturbance of the signal and the reduction of the reproduction output and to carry out preformat recording capable of achieving the signal quality acceptable for practical use. Furthermore, the maximum value of the displaced angle in the direction of the magnetic field is reduced as compared with the above-mentioned case where the direction in which a magnetic field is applied is determined by selecting the synchronous signal pattern 5, servo signal pattern 7 and the servo signal pattern 35.

(Fourth Embodiment)

Figure 26:
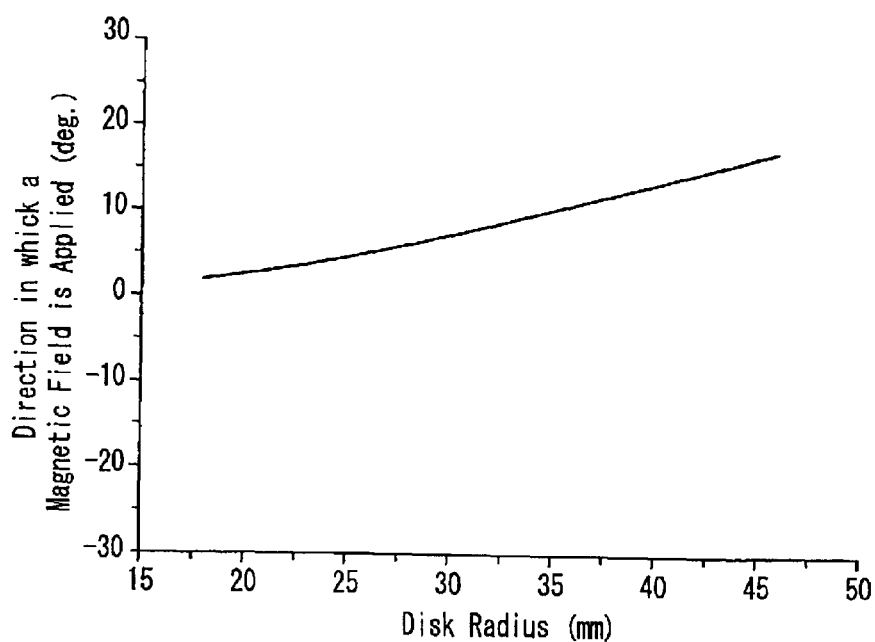
FIG. 26 is a graph showing the relationship between the direction in which a magnetic field is applied by a further permanent magnet provided for the master information magnetic recording apparatus and the radius of the disk in a fourth embodiment of the present invention.
Figure 27:
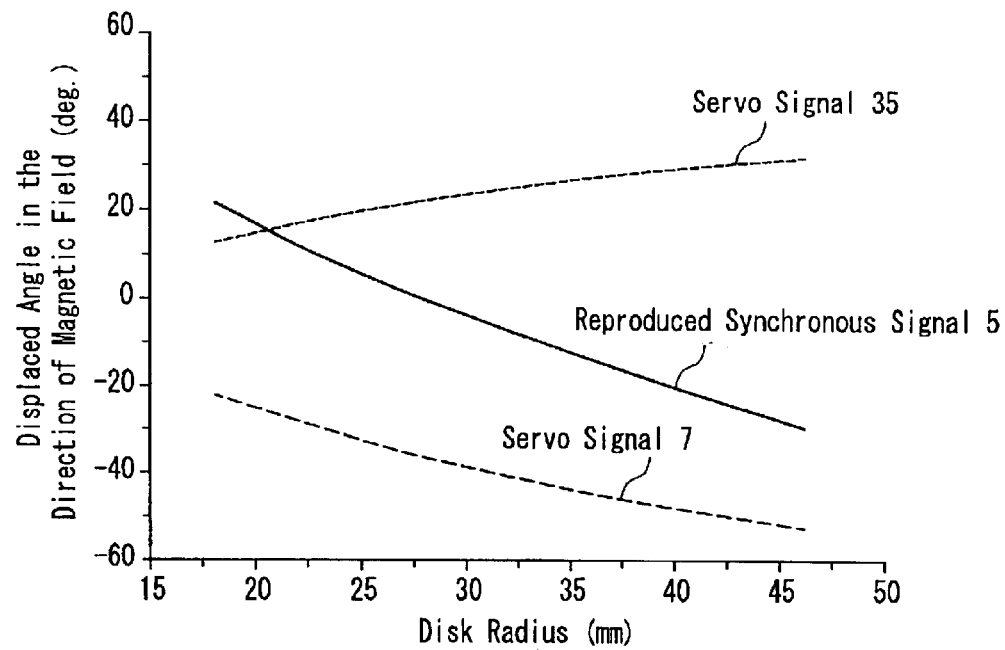
FIG. 27 is a graph showing the relationship between the displaced angle in the direction in which a magnetic field is applied and the radius of the disk in the master information magnetic recording apparatus according to the fourth embodiment.

FIG. 26 is a graph showing the relationship between the direction in which a magnetic field is applied by a further permanent magnet provided in the master information magnetic recording apparatus and the radius of the disk; FIG. 27 is a graph showing the relationship between the displaced angle in the direction of the magnetic field and the radius of the disk in a master information magnetic recording apparatus; and FIG. 28 is a graph showing the relationship between the reproduction output and the radius of the disk when reproducing the magnetic disk recorded by the master information magnetic recording apparatus.

When the direction in which a magnetic field is applied is determined by carrying out a predetermined weighing from the inner circumference to the outer circumference so that the displaced angle of the pattern angle of the servo signal pattern 35 in the direction of the magnetic field is made to be smaller than the displaced angle of the pattern angle of the servo signal pattern 7 in the direction of the magnetic field, the direction in which a magnetic field is applied is shown by a curve in FIG. 26. The displaced angles of the servo signal pattern 7, servo signal pattern 35 and the synchronous signal pattern 5 are shown by curves in FIG. 27, respectively. The reproduction outputs of the servo signal pattern 7, servo signal pattern 35 and the synchronous signal pattern 5 are shown by curves in FIG. 28, respectively.

Figure 28:
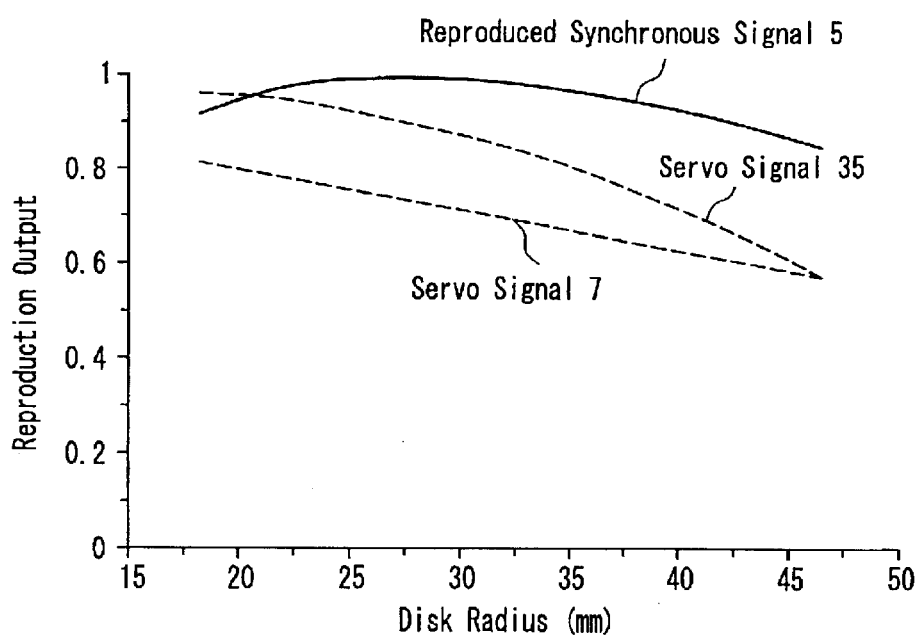
FIG. 28 is a graph showing the relationship between the reproduction output and the radius of the disk when reproducing the magnetic disk recorded by the master information magnetic recording apparatus according to the fourth embodiment.

As shown by a curve in FIG. 23 mentioned above in which a magnetic field is applied in the simple average direction, the reproduction output of the servo signal pattern 35, which is 0.5 and is lower than that of the servo signal pattern 7 when the radius of the disk is 46 mm, can be improved to 0.6 as shown in FIG. 28, which is the same level as the reproduction output of the servo signal pattern 7.

Thus, according to the fourth embodiment, the reproduction output can be improved significantly as compared with the case of using the prior art. Therefore, it is possible to minimize the phase disturbance of the signals and the influence of noise.

(Fifth Embodiment)

Figure 29:
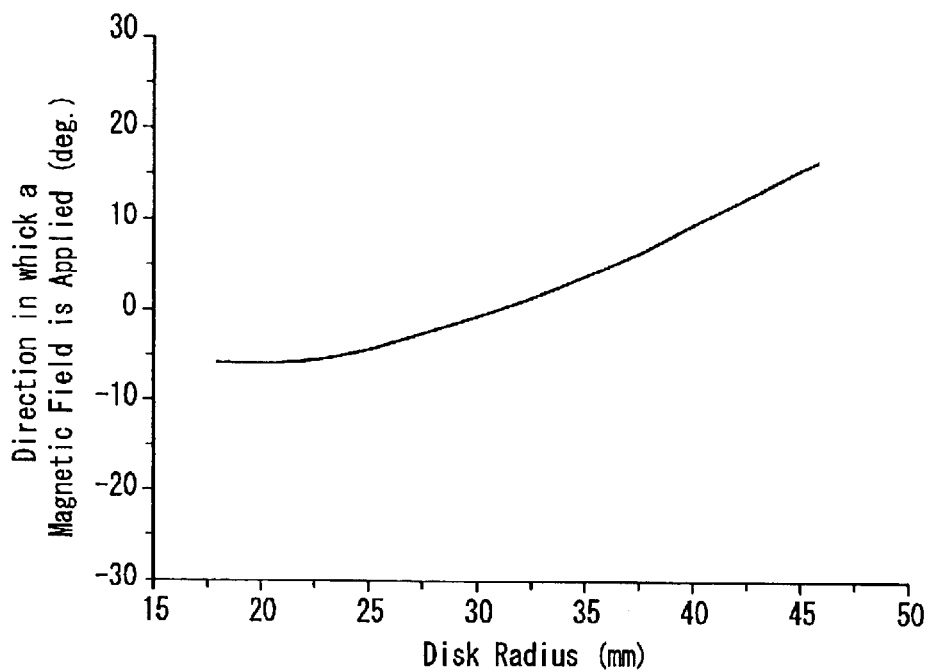
FIG. 29 is a graph showing the relationship between the direction in which a magnetic field is applied by a further permanent magnet provided for the master information magnetic recording apparatus and the radius of the disk according to a fifth embodiment.
Figure 30:
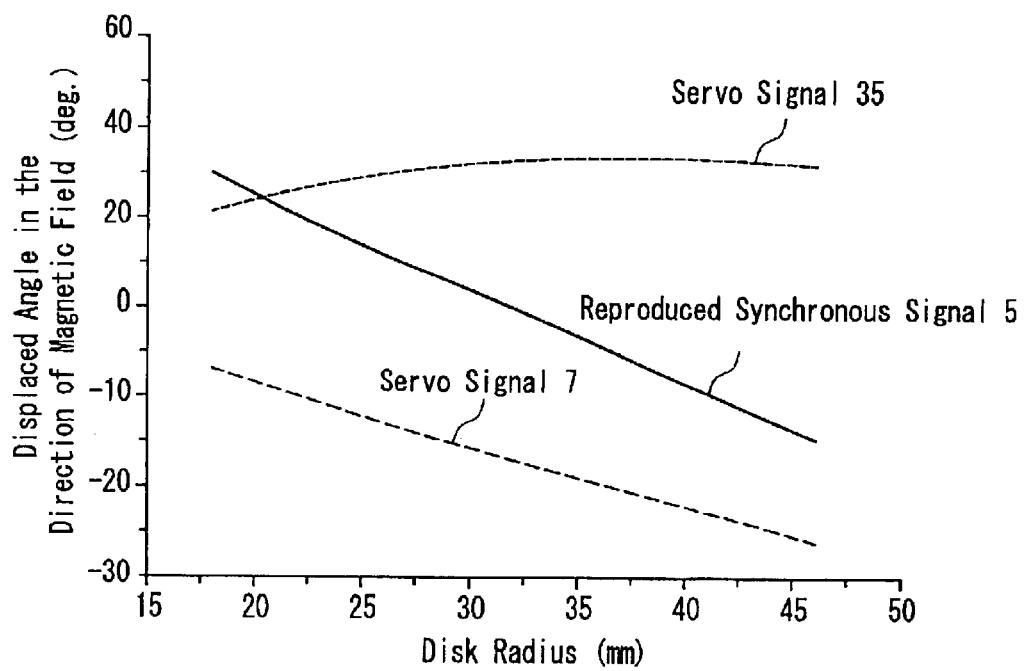
FIG. 30 is a graph showing the relationship between the displaced angle in the direction of the magnetic field and the radius of the disk in the master information magnetic recording apparatus according to the fifth embodiment.

FIG. 29 is a graph showing the relationship between the direction in which a magnetic field is applied by a further permanent magnet provided for the master information magnetic recording apparatus and the radius of the disk; FIG. 30 is a graph showing the relationship between the displaced angle in the direction of the magnetic field and the radius of the disk in the master information magnetic recording apparatus; and FIG. 31 is a graph showing the relationship between the reproduction output and the radius of the disk when reproducing the magnetic disk recorded by the master information recording apparatus.

Figure 31:
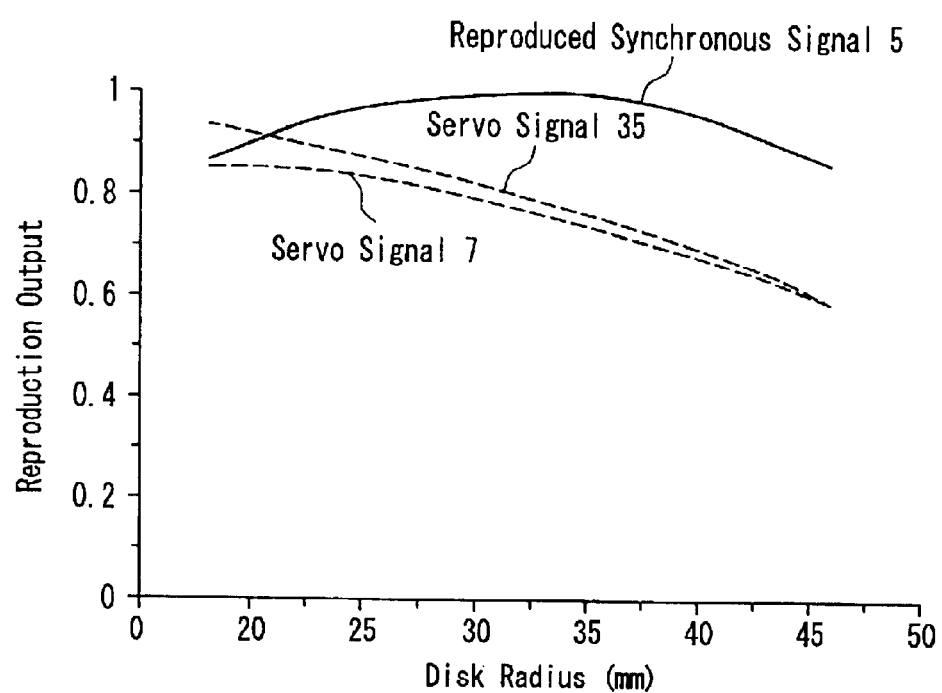
FIG. 31 is a graph showing the relationship between the reproduction output and the radius of the disk when reproducing the magnetic disk recorded by a master information recording apparatus according to the fifth embodiment.
Figure 32:
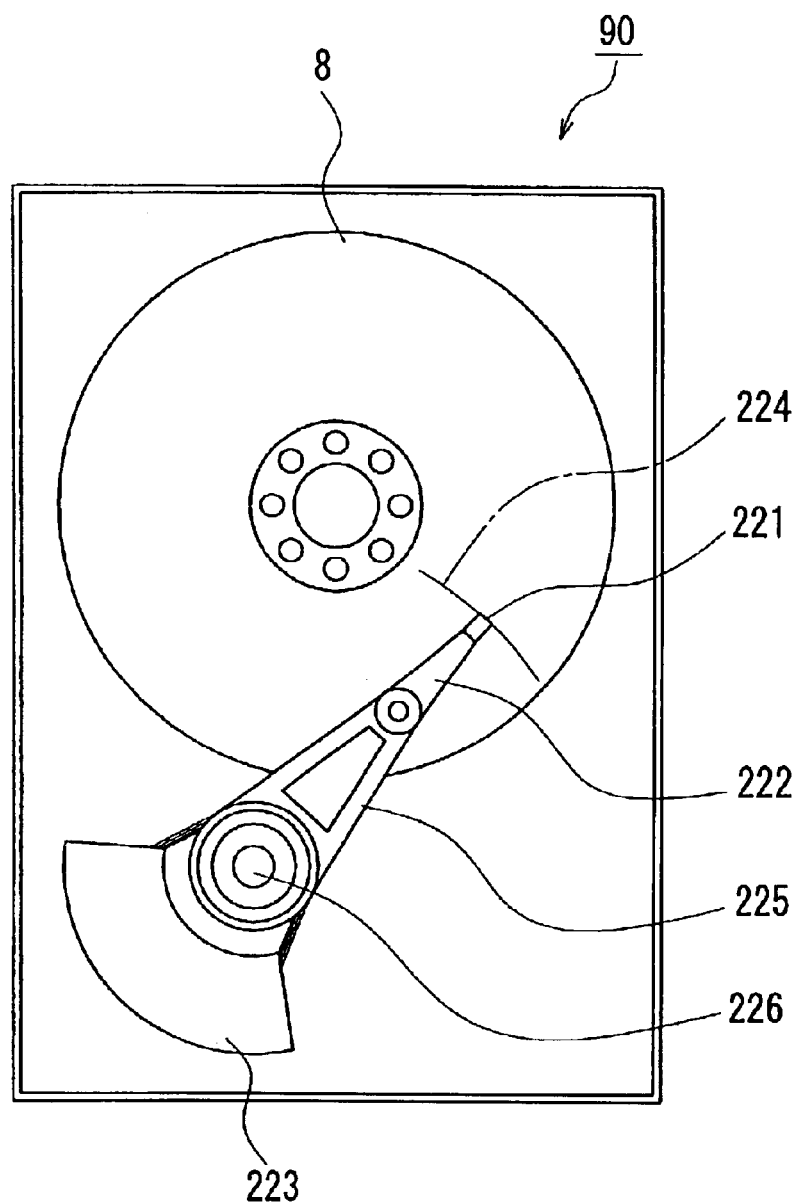
FIG. 32 is a plan view showing a configuration of a magnetic disk device provided with a magnetic disk in which master information is recorded by a conventional master information magnetic recording apparatus.
Figure 33:
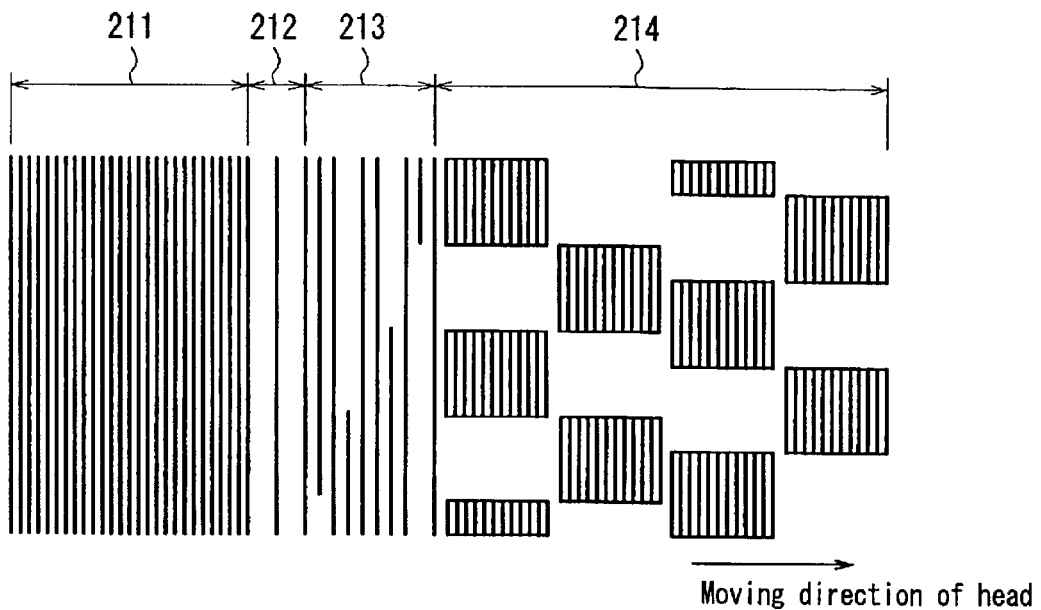
FIG. 33 is an enlarged view for explaining a configuration of preformat information signal patterns, which is to be recorded on a magnetic disk.
Figure 34:
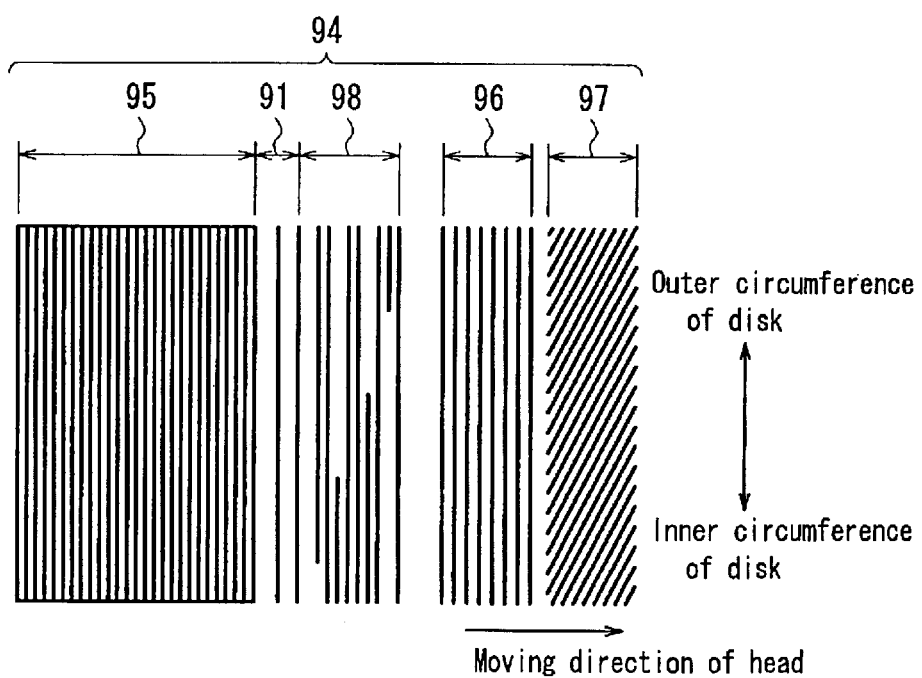
FIG. 34 is an enlarged view for explaining a configuration of another preformat information signal patterns, which is to be recorded on a magnetic disk.

In the examples shown in FIGS. 29 to 31 according to the fifth embodiment, weighing is changed according to the radial position of the magnetic disk. Specifically, in the inner circumference of the magnetic disk, weighing is carried out so that the displaced angle of the servo signal pattern 7 in the direction of the magnetic field is smaller than the displaced angle of the servo signal pattern 35 in the direction of the magnetic field. In the outer circumference of the magnetic disk, weighing is carried out so that the displaced angle of the servo signal pattern 35 in the direction of the magnetic field is smaller than the displaced angle of the servo signal pattern 7 in the direction of the magnetic field.

Thus, when the direction in which a magnetic field is applied is determined at the inner circumference of the magnetic disk by carrying out the weighting so that the displaced angle of the servo signal pattern 7 in the direction of the magnetic field is smaller than the displaced angle of the servo signal pattern 35 in the direction of the magnetic field, it is possible to improve the reproduction output of the servo signal pattern 7 having the lowest reproduction output at the inner circumference of the magnetic disk.

By finely defining the weighing along the radial direction of the magnetic disk, it is possible to improve the minimum output of each pattern at the desirable radial position of the magnetic disk. Further, it is possible to minimize the difference of the reproduction output between patterns. Therefore, it is possible to adjust the reproduction output along the radial position of the magnetic disk so as to satisfy the performance required for the reproduction output.

Note here that in the fifth embodiment, the example of using the weighing expressed by the linear function with respect to the radial position of the magnetic disk is explained. However, the present invention is not limited to this. Weighing expressed by the secondary or higher order equation, various kinds of arbitrary functions or plurality of functions may be employed.

Thus, according to the first to fifth embodiments, as compared with the case where the prior art is used, the reproduction output can be improved significantly. Therefore, it is possible to minimize the phase disturbance of the signal or the influence of noise and to carry out the preformat recording capable of obtaining the quality of reproduced signal acceptable for practical use.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A master information magnetic recording apparatus comprising, a master information carrier having a surface on which a ferromagnetic thin film pattern corresponding to an information signal is formed, a master information carrier facing member for allowing a recording surface formed on a magnetic recording medium to face the surface of the master information carrier on which the ferromagnetic thin film pattern is formed, and a magnetic field applying member for applying a magnetic field to the ferromagnetic thin film pattern formed on the surface of the master information carrier that faces the recording surface formed on the magnetic recording medium and to the magnetic recording medium in order to record the information signals into the magnetic recording medium, wherein the ferromagnetic thin film pattern formed on the surface of the master information carrier comprises not less than two kinds of different patterns, each having a different pattern angle showing an angle with respect to the direction of the relative movement between the magnetic head mounted on an arm and the rotating magnetic recording medium, and the member for applying a magnetic field applies the magnetic field along the direction which is perpendicular to the direction shown by an angle that is smaller than the maximum pattern angle among the not less than two kinds of patterns, and that is larger than the minimum pattern angle among the not less than two kinds of patterns.

2. The master information magnetic recording apparatus according to claim 1, wherein the not less than two kinds of patterns are two kinds of patterns each having a different pattern angle.

3. The master information magnetic recording apparatus according to claim 1, wherein the direction in which a magnetic field is applied is a direction perpendicular to an average direction of the directions shown by the pattern angles of two kinds of patterns among the not less than two kinds of patterns.

4. The master information magnetic recording apparatus according to claim 2, wherein the direction in which a magnetic field is applied is a direction with a weight assigned so that the angle with respect to either one of directions is smaller than the angle with respect to another direction, in the two kinds of directions perpendicular to the directions shown by the pattern angles of the two kinds of patterns, respectively.

5. The master information magnetic recording apparatus according to claim 4, wherein the magnetic recording medium is a magnetic disk, and the weight changes along the radial direction of the magnetic disk.

6. The master information magnetic recording apparatus according to claim 1, wherein the member for applying a magnetic field comprises a permanent magnet.

7. The master information magnetic recording apparatus according to claim 6, wherein the permanent magnet is provided with a facing surface that faces the master information carrier, and the facing surface is substantially fan-shaped.

8. The master information magnetic recording apparatus according to claim 1, wherein the member for applying a magnetic field is disposed on the master information carrier at the opposite side to the magnetic recording medium.

9. The master information magnetic recording apparatus according to claim 1, wherein the member for applying a magnetic field comprises a pair of magnetic cores and a coil wound to at least one of the pair of magnetic cores.

10. The master information magnetic recording apparatus according to claim 1, wherein the master information carrier facing member comprises, a lower flange provided for superimposing and mounting the magnetic recording medium and the master information carrier in this order, an upper flange provided on the lower flange for pressing an edge portion of the upper surface of the master information carrier, and a connecting member for connecting the lower flange to the upper flange.

11. The master information magnetic recording apparatus according to claim 10, wherein the master information carrier facing member further comprises an elastic plate provided between the lower flange and the magnetic recording medium.

12. The master information magnetic recording apparatus according to claim 11, wherein center holes are formed at the centers of the magnetic recording medium and the elastic member, respectively.

13. The master information magnetic recording apparatus according to claim 12, further comprising a suction device for drawing the master information carrier toward the side of the information recording medium in order to bring the master information carrier into contact with the magnetic recording medium, wherein the suction device is provided with an exhaust duct so as to communicate with the center holes formed at the centers of the magnetic recording medium and the elastic plate, respectively.

14. The master information magnetic recording apparatus according to claim 1, further comprising a suction device for drawing the master information carrier toward the side of the information recording medium in order to bring the master information carrier into contact with the magnetic recording medium.

15. A method for manufacturing a magnetic recording medium in which master information is recorded in advance, the method comprising allowing a recording surface formed on a magnetic recording medium to face a surface of a master information carrier on which a ferromagnetic thin film pattern corresponding to an information signal is formed, and applying a magnetic field to the ferromagnetic thin film pattern formed on the surface of the master information carrier that faces the recording surface formed on the magnetic recording medium and to the magnetic recording medium, in order to record the information signal into the magnetic recording medium, wherein the ferromagnetic thin film pattern formed on the surface of the master information carrier comprises not less than two kinds of different patterns, each having a different pattern angle showing an angle with respect to the direction of the relative movement between the magnetic head mounted on an arm and the rotating magnetic recording medium, and the member for applying a magnetic field applies the magnetic field along the direction in which a magnetic field is applied, the direction being perpendicular to the direction shown by an angle that is smaller than the maximum pattern angle among the not less than two kinds of patterns and larger than the minimum pattern angle among the not less than two kinds of patterns.

16. The method according to claim 15, wherein the not less than two kinds of patterns are two kinds of patterns each having a different pattern angle.

17. The method according to claim 15, wherein the direction in which a magnetic field is applied is a direction perpendicular to an average direction of the directions shown by the pattern angles of two kinds of patterns among the not less than two kinds of patterns.

18. The method according to claim 16, wherein the direction in which a magnetic field is applied is a direction with a weight assigned so that the angle with respect to either one of directions is smaller than the angle with respect to another direction in the two kinds of directions perpendicular to the directions shown by the pattern angles of the two kinds of patterns, respectively.

19. The method according to claim 18, wherein the magnetic recording medium is a magnetic disk, and the weight changes along the radial direction of the magnetic disk.

20. The master information magnetic recording apparatus according to claim 2, wherein the direction in which a magnetic field is applied is a direction perpendicular to an average direction of the directions shown by the pattern angles of two kinds of patterns among the not less than two kinds of patterns.

* * * * *

UNITED STATES PATENT AND TRADEMARK OFFICE
CERTIFICATE OF CORRECTION

PATENT NO. : 6,859,339 B2  
APPLICATION NO. : 10/355860  
DATED : February 22, 2005  
INVENTOR(S) : Ban et al.

Page 1 of 1

It is certified that error appears in the above-identified patent and that said Letters Patent is hereby corrected as shown below:

Title Pg. Item (56) Ref. Cited, Please Insert the Following References
-- JP 11-144218 and US 6,529,341 --

Signed and Sealed this

Twenty-fourth Day of June, 2008

JON W. DUDAS  
*Director of the United States Patent and Trademark Office*